(12) United States Patent  
Inamori

(10) Patent No.: US 6,340,959 B1  
(45) Date of Patent: Jan. 22, 2002

(54) DISPLAY CONTROL CIRCUIT

(75) Inventor: Yoshimitsu Inamori, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/195,542

(22) Filed: Nov. 19, 1998

(30) Foreign Application Priority Data

Nov. 19, 1997 (JP) .............................................. 9-318707

(51) Int. Cl.⁷ ................................................ G09G 5/00
(52) U.S. Cl. .......................... 345/3.1; 345/3.2; 348/793
(58) Field of Search ........................... 345/3, 2, 1, 211, 345/212, 213, 87, 1.1, 1.2, 1.3, 2.1, 2.2, 2.3, 3.1, 3.2, 3.3, 3.4; 348/790, 791, 792, 793

(56) References Cited

U.S. PATENT DOCUMENTS

| | | | |
|---|---|---|---|
| 4,855,728 A | * 8/1989 | Mano et al. ..................... | 345/3 |
| 4,926,166 A | 5/1990 | Fujisawa et al. | |
| 4,998,099 A | 3/1991 | Ishii | |
| 5,150,109 A | 9/1992 | Berry | |
| 5,327,156 A | * 7/1994 | Masukane et al. ............. | 345/3 |
| 5,488,385 A | 1/1996 | Singhal et al. | |
| 5,694,141 A | * 12/1997 | Chee ............................... | 345/3 |
| 5,841,418 A | * 11/1998 | Bril et al. ....................... | 345/3 |

FOREIGN PATENT DOCUMENTS

| | | |
|---|---|---|
| JP | 61-282886 | 12/1986 |
| JP | 63-083798 | 4/1988 |

* cited by examiner

Primary Examiner—Xiao Wu

(57) ABSTRACT

In the display control device of the present invention, individual control signals are supplied to a liquid crystal display device and a television-signal encoder respectively from a reading circuit so that RGB data, stored in a display memory, is commonly used by those devices. Therefore, the number of data bus lines, that is, the number of terminals of the display control circuit, can be reduced to, for example, 18, namely, 6 for each of the colors of R, G and B; thus, the number of terminals for RGB data can be reduced to ½. With this arrangement, in a display control circuit that is capable of display-driving a liquid crystal display device installed as an integral part of an appliance such as a portable-type information terminal as well as display-driving an external television receiver simultaneously so as to display the same image, the number of terminals of the display control circuit can be reduced even when the display control circuit serving as a digital and the television-signal encoder containing an analog portion are provided as separated devices.

9 Claims, 16 Drawing Sheets

DISPLAY CONTROL CIRCUIT

FIELD OF THE INVENTION

The present invention relates to a display control circuit which is preferably applied to a portable information terminal that is an electronic appliance and an information-processing apparatus such as a personal computer, and which realizes the same display simultaneously both on a matrix display device installed in the portable information terminal or the information-processing apparatus and on a television receiver with a large screen size.

BACKGROUND OF THE INVENTION

For example, Japanese Laid-Open Patent Publication No. 282886/1986 (Tokukaishou 61-282886) discloses a typical prior-art technique in which, as described above, a portable information terminal or an image-processing apparatus is allowed to display images on an external television receiver with a larger screen size, in addition to its image on the matrix display device such as a liquid crystal display installed therein. FIG. 17 shows the construction of an image display in accordance with the above-mentioned prior art.

In the prior-art technique, image data formed by a processing unit, image data picked up by a camera, or image data received by a television receiver is stored in a display memory 1 as RGB data. An address signal, released from a reading circuit 2 used for liquid crystal display or a reading circuit 3 used for monitoring display, and a control signal, such as a chip select signal CS and an output enable signal OE, are selectively switched by a switching circuit 4, and inputted to the display memory 1. The switching circuit 4, which has received a selection signal between the liquid crystal display and the monitor from a register in response to a user's operation, carries out the corresponding switching between the address signal and the control signal released from the reading circuit 2 used for liquid crystal display and the reading circuit 3 used for monitoring display. RGB data, read from the display memory 1 in response to the address signal and the control signal from the switching circuit 4, are commonly supplied to a television-signal encoder 6 and a liquid crystal display 7 through a data bus 5.

A horizontal synchronous signal HSYNC, a vertical synchronous signal VSYNC, a data clock DCLK and an enable signal ENAB are inputted to the liquid crystal display 7 from the reading circuit 2 used for liquid crystal display. The liquid crystal display 7, when "liquid crystal" is selected by the switching circuit 4 as its display output, receives the RGB data from the display memory 1 based on the control signal from the reading circuit 2 used for liquid crystal display, thereby carrying out an image display.

Control signals, such as a horizontal synchronous signal HSYNC, a vertical synchronous signal VSYNC and a pixel clock PXCLK, are supplied from the reading circuit 3 used for monitoring display to the television signal encoder 6. The television signal encoder 6, when "monitor" is selected as its display output, acquires the RGB data from the display memory 1 in accordance with the control signal, forms an analog video signal, and releases it to the television receiver 8.

In this manner, image displaying on the liquid crystal display 7 that is integrally installed on the portable information terminal or the information processing apparatus and image displaying by means of the external television receiver 8 are selectively carried out. The display memory 1, the reading circuit 2 used for liquid crystal display, the reading circuit 3 used for monitoring display, the switching circuit 4 and the television signal encoder 6 are integrally formed in a display control circuit 10.

However, the problem with the above-mentioned prior-art technique is that simultaneous image displays are not available between the liquid crystal display 7 and the television receiver 8. In this regard, so-called desktop-type and laptop-type information processing apparatuses, which allow various input operations by using the cursor, make it possible to carry out an input operation if image displaying is carried out either on the liquid crystal display 7 or the television receiver 8. However, portable information terminals, which carry out input operations by touching the liquid crystal screen with a pen, hand or finger, have a problem in which when image displaying is being carried out on the television receiver 8, no input operations are available. In particular, in the case when an explanation is given while updating display screens in an occasion such as a presentation, switching to "liquid crystal display" has to be made each time the screen is updated, so as to carry out input operations.

For example, Japanese Laid-Open Patent Publication No. 83798/1988 (Tokukaishou 63-83798) discloses another prior-art technique that can solve such a problem. FIG. 18 shows this prior art. Here, in the construction of FIG. 18, those portions similar to and corresponding to the aforementioned construction of FIG. 17 are indicated by the same reference numerals, and the description thereof is omitted.

In the prior-art technique, RGB data, which is sent from the display memory 1 through the data bus 5, is commonly supplied to a liquid crystal data latch circuit 11 and a monitor data latch circuit 12, and these data latch circuits 11 and 12 respectively carry out latch processes on the RGB data in response to latch timing from the aforementioned reading circuits 2 and 3. Here, the "liquid crystal/monitor" selection signal, which is supplied from the register to the switching circuit 4, serves as a signal for giving the address signal and the control signal from the reading circuits 2 and 3 to the display memory 1 in a time-division manner.

This arrangement allows the liquid crystal data latch circuit 11 and the monitor data latch circuit 12 to respectively read the RGB data from the common display memory 1. The display memory 1, the reading circuits 2 and 3, the switching circuit 4 and the data latch circuits 11 and 12 are integrally formed in a display control circuit 20, and the television signal encoder 6 is installed as a separated device from the display control circuit 20. The RGB data, which has been latched by the liquid crystal data latch circuit 11, is read in optimal reading timing for the liquid crystal display 7, and supplied to the liquid crystal display 7 through a data bus 13. Moreover, the RGB data, which has been latched by the monitor data latch circuit 12, is read in optimal reading timing for the television receiver 8, and supplied to the television signal encoder 6 through a data bus 14.

As illustrated in FIG. 18, when the television signal encoder 6 is provided as the separated device, the number of terminals of the display control circuit 20 needs to be increased so as to correspond to the two systems of the data buses 13 and 14 for RGB data. Therefore, for example, in the case of six signal lines required for each color of R, G and B, the number of terminals required for the integrated circuits of the display control circuit 20 amounts to 36, resulting in an increase in the number of terminals.

In this regard, as illustrated in FIG. 17, the solution to the above-mentioned problem is to integrally install the television signal encoder 6 in the integrated circuits of the display control circuit 20; however, there are some cases in which the television signal encoder 6 can not be integrally installed in the display control circuit 20 and other cases in which it is considered to be more beneficial not to provide the built-in construction. One of the reasons is that it is difficult to create an ASIC which is mixedly provided with the television signal encoder 6 that is a digital encoder with an analog-circuit portion and the rest of the circuits, such as the display memory 1 and the reading circuits 2 and 3, that are digital circuits, Moreover, the separated reading circuits 2 and 3 have to be provided, making the circuit construction complex, and high-speed accessing is required for allowing the two reading circuits 2 and 3 to access the common display memory 1 in a time-division manner.

SUMMARY OF THE INVENTION

The objective of the present invention is to provide a display control circuit which reduces the number of terminals with a simple construction and also achieves simultaneous displays, even when a digital encoder is provided as a separated device.

In order to achieve the above-mentioned objective, the first display control circuit of the present invention is characterized in that, when the number of scanning lines of a matrix display is the same as or similar to the number of effective scanning lines of a television receiver, RGB data is commonly outputted to the matrix display device and a digital encoder after a predetermined time period has elapsed from receipt of a vertical synchronous signal, while control signals, such as a clock signal and a synchronous signal, are outputted individually.

With the above-mentioned construction, in the case when the number of scanning lines of a matrix display device is the same as or similar to the number of effective scanning lines of a television receiver, for example, in the case when the number of scanning lines of the matrix display device installed in an electronic appliance such as a portable information terminal as an integral part with the display control circuit is 240, namely, one-half of the VGA (Video Graphics Array), and the number of the scanning lines of the television receiver is, for example, 525, namely, the number of effective scanning lines in one field is 230, the matrix display device and the television receiver are properly controlled respectively by using individual control signals.

Therefore, upon providing the same image display simultaneously on the matrix display device and on the television receiver, the RGB data that is to be displayed on the television receiver is made the same as RGB data on the matrix display device. That is, since the common video memory and reading circuit can be used, it is possible to reduce the number of terminals of the display control circuit and also to simplify the circuit construction, even when the digital encoder used for the television receiver is provided as a separated device.

The above-mentioned arrangement is not limited to the case in which the number of scanning lines of the matrix display device and the number of effective scanning lines of the television receiver are the same or similar to each other; and it may be applied to the following case: When the number of scanning lines of the matrix display device is equal or similar to twice the number of effective scanning lines of the television receiver, the RGB data is commonly outputted to the matrix display device and a digital encoder after a predetermined time period has elapsed from receipt of a vertical synchronous signal, with a writing pulse for writing the RGB data from the latch circuit of the matrix display device to the display element being doubled in its frequency, while control signals, such as a clock signal and a synchronous signal, are outputted individually.

In this arrangement, in the case when the number of scanning lines of a matrix display device is equal or similar to twice the number of effective scanning lines of the television receiver, for example, in the case when the number of scanning lines of the matrix display device is 480 of the VGA, and the number of effective scanning lines in one field is 230 in the aforementioned NTSC system, while the output of the RGB data is started from a predetermined horizontal scanning period, the writing pulse for writing the RGB data from the latch circuit of the matrix display device to the display element is doubled in its frequency as described above by using individual control signals so that the RGB data corresponding to one line in the television receiver is doubled vertically so as to be displayed on two lines in the matrix display device.

Therefore, even if there is a difference of virtually double in the vertical resolution between the matrix display device and the television receiver, image displaying can be carried out simultaneously by using the common RGB data; thus, it becomes possible to reduce the number of terminals of the display control circuit and also to simplify the circuit construction, even when the digital encoder used for the television receiver is provided as a separated device.

Moreover, in order to solve the above-mentioned objective, the second display control circuit of the present invention is characterized in that RGB data for use in the matrix display device and RGB data for use in the television receiver are subjected to time-division multiplexing and commonly outputted to the matrix display device and the digital encoder, with the control signals, such as a clock signal and a synchronous signal, being outputted individually, so that the control signals allow the matrix display device and the digital encoder to selectively acquire the RGB data that has been subjected to time-multiplexing.

With the above-mentioned arrangement, the matrix display device and the digital encoder are respectively allowed to properly acquire the RGB signal that has been time-division multiplexing, by the control signals that are provided individually; therefore, even if the digital encoder is provided as a separated device, it is possible to commonly use the output terminal of the RGB signal, and consequently to reduce the number of the terminals.

In the second display control circuit, in the case when the number of scanning lines of a matrix display device is equal or similar to twice the number of effective scanning lines of the television receiver, the following arrangement may be applied. The output period of the RGB data is divided by three, and RGB data corresponding to one pixel to be sent to the digital encoder and RGB data corresponding to two pixels to be sent to the matrix display device are subjected to multiplexing, and outputted after a lapse of a predetermined period from the receipt of a vertical synchronous signal.

With this arrangement, when the number of scanning lines of the matrix display device is approximately twice the number of effective scanning lines of the television receiver as in the case of the aforementioned VGA, the matrix display device is allowed to write data corresponding to two lines during the horizontal scanning period that corresponds to one line of the television receiver by doubling the frequency of the writing pulse to be sent from the latch circuit to the display elements. Therefore, image displaying, which is equivalent to VGA full-spec, can be carried out on the matrix display device having the number of frames that is double the 30 frames of the television receiver.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 6, the following description will discuss the first embodiment of the present invention.

Figure 1:
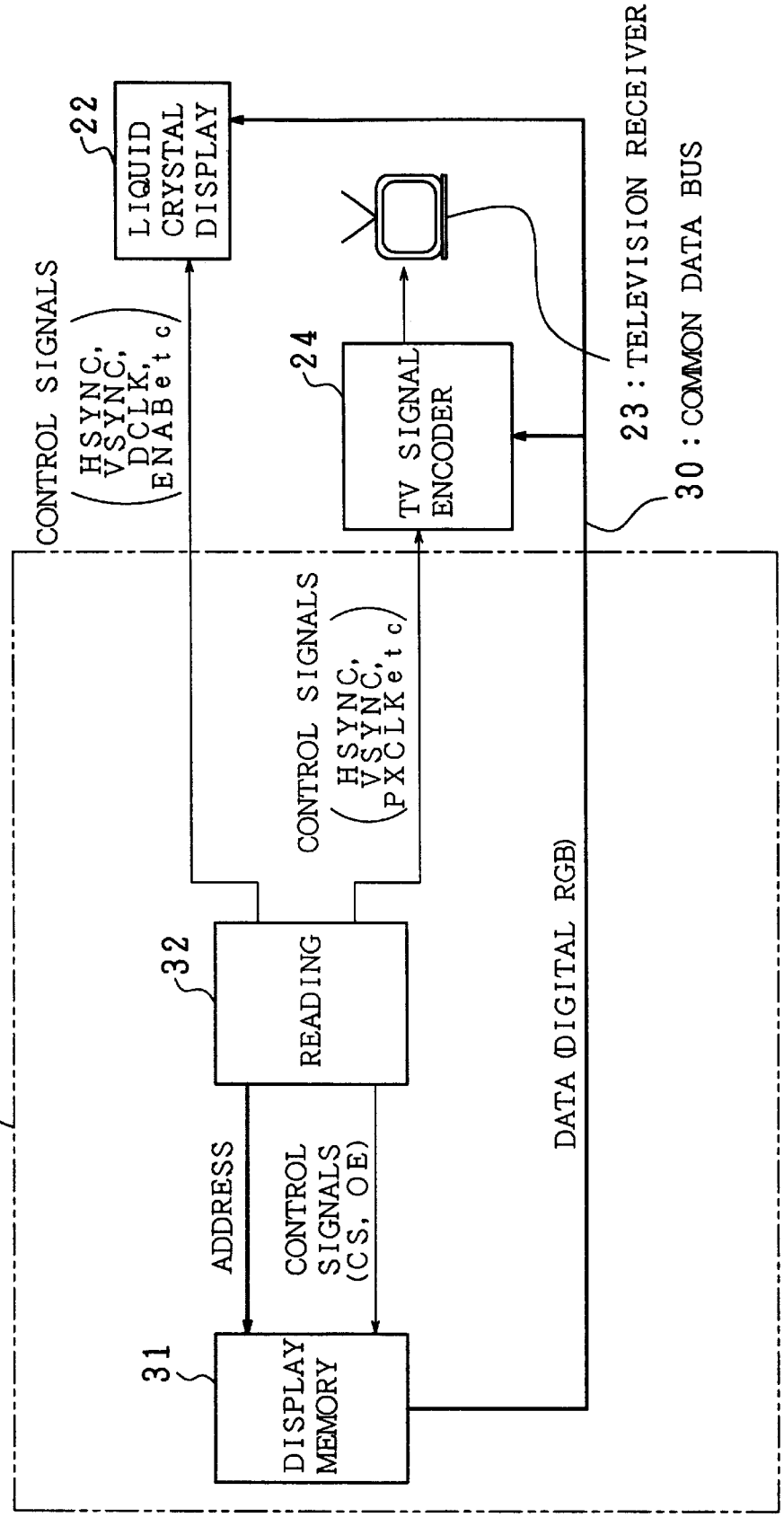
FIG. 1 is a block diagram that schematically shows the construction for image display of the first embodiment of the present invention.

FIG. 1 is a block diagram that shows a schematic construction of the first embodiment of the present invention. The present invention is preferably applied to a portable information terminal and an information processing apparatus, and each of the portable information terminal and the information processing apparatus has a display control circuit 21 provided as an integrated circuit, a liquid crystal display device 22 that is driven by the display control circuit 21 so as to display images, and a television-signal encoder 24, installed as a device separated from the display control circuit 21, for driving an external television receiver 23 so as to display images.

The construction as shown in FIG. 1 relates to a liquid crystal device of the ¼ VGA system in which the number of scanning lines of the liquid crystal display device 22 is set at 240 that is ½ of VGA and the horizontal resolution thereof is set at 320 dots that is also ½ of VGA. Here, the television receiver 23 is that of the NTSC system in which the number of scanning lines is set at 525 and the number of effective scanning lines in one field is set at 230. Therefore, the example as shown in FIG. 1 is a structural example in which the number of scanning lines of the liquid crystal display 22 is similar to the number of effective scanning lines of the television receiver 23.

Additionally, the above-mentioned VGA is a basic display standard of personal computers PC/AT, and its display capacity is set at 640×480 dots. Today's personal computers and portable information terminals are constructed in conformity to this standard so that software or processing data can be commonly used. Although not limited thereby, the present invention is preferably applied to information processing apparatuses that conform to the VGA standard.

The display control circuit 21 is mainly constituted by a display memory 31 (storage means) and a single reading circuit 32 (reading means). An address signal and control signals, such as a chip select signal CS, an output enable signal OE and read/write signals RAS and CAS, are supplied from the reading circuit 32 to the display memory 31, and the display memory 31 outputs RGB data that is located in a region specified by the address to a data bus 30. Alternatively, it stores the display data supplied to the data bus 30 in a region specified by the address signal. The data bus 30 is commonly connected to the liquid crystal display device 22 and the television-signal encoder 24. Here, with respect to the television signal encoder 24, for example, BU14225KV manufactured by Rhom Co., Ltd. is listed.

Individual control signals are supplied from the reading circuit 32 to the liquid crystal display device 22 and the television-signal encoder 24. Control signals, sent to the liquid crystal display device 22 for image display, are, for example, a horizontal synchronous signal HSYNC, a vertical synchronous signal VSYNC, a data clock signal DCLK, an enable signal ENAB, etc. Moreover, control signals, sent to the television-signal encoder 24 for image display, are, for example, a horizontal synchronous signal HSYNC, a vertical synchronous signal VSYNC, a pixel clock PXCLK, etc.

The liquid crystal display device 22 acquires the inputted RGB data based upon the control signals, and carries out image display by means of the non-interlace scanning system. The television-signal encoder 24 converts the inputted RGB data into an analog signal based upon the control signals so as to convert it into an analog image signal of the composite form or Y-C separation form, thereby carrying out image display on the television receiver 23 by means of the interlace scanning system.

Figure 2:
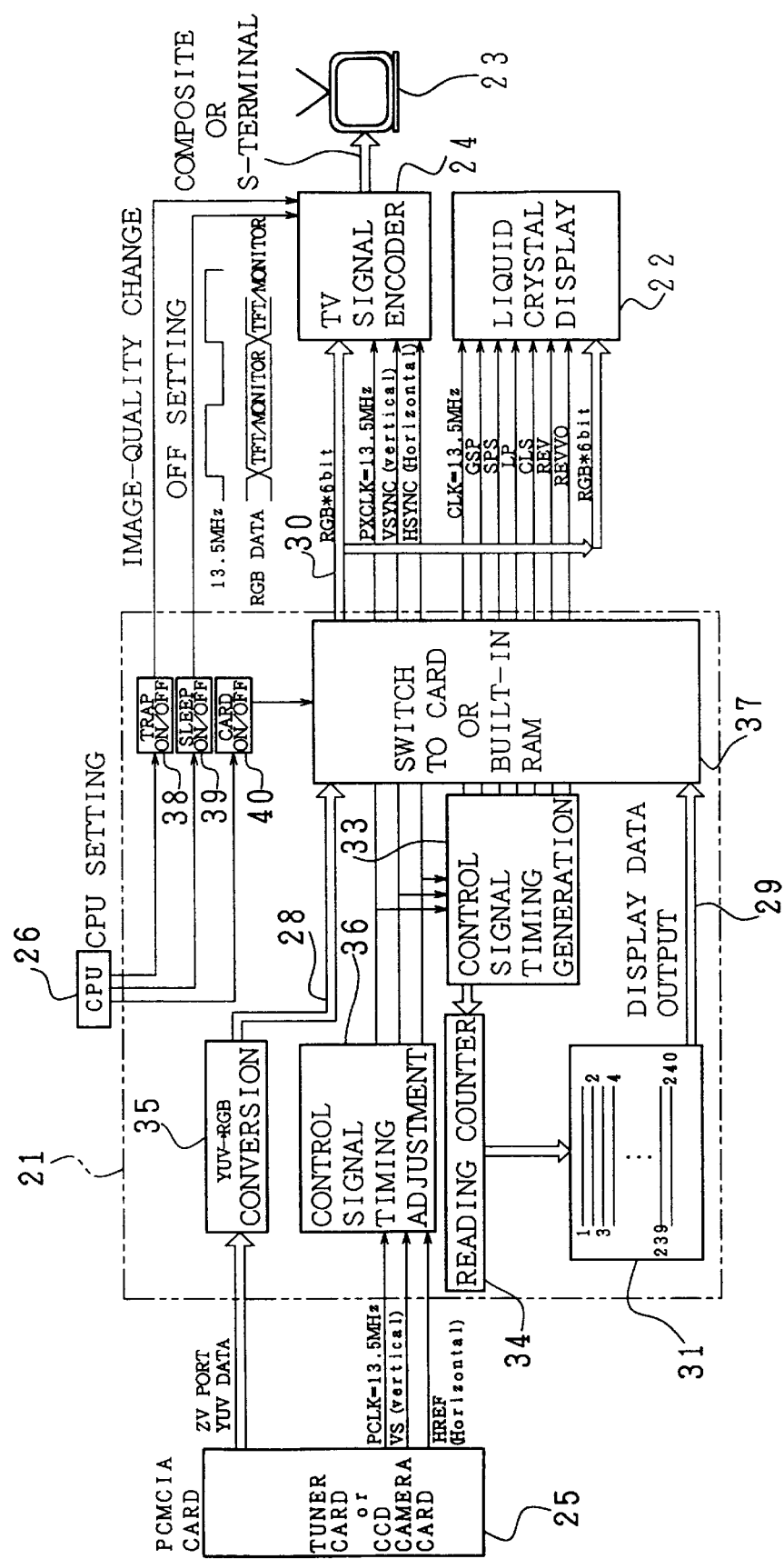
FIG. 2 is a block diagram that schematically shows a specific construction of the display control circuit shown in FIG. 1.

FIG. 2 is a block diagram that shows a schematic construction of the above-mentioned display control circuit 21.

The display control circuit 21 is provided with a so-called ZV port, and the display control circuit 21 outputs either display data inputted from a PCMCIA card 25 attached to the ZV port or display data from the display memory 31 to the liquid crystal display device 22 and the television-signal encoder 24. For this purpose, the display control circuit 21 is constituted by the display memory 31, a control-signal timing generation circuit 33 serving as the reading circuit 32, a readout counter 34, a YUV to RGB conversion circuit 35, a control-signal timing adjustment circuit 36, a switching circuit 37, and ON/OFF circuits 38, 39 and 40.

Additionally, the ZV port satisfies an interface standard for allowing high-speed operation of multi-media data such as animations and voice, which is stipulated by the U.S. PCMCIA Standard, etc. Moreover, the present invention is also applicable to information processing apparatuses having the ZV port; however, it is not limited by those information processing apparatuses having the ZV port.

Moreover, those portable information terminals or personal computers in which the display control circuit 21 is installed are constructed so that TV tuner cards and CCD (Charge Coupled Device) camera cards in accordance with the PCMCIA standard are attachable; here, those devices which are attached to the ZV port with these cards installed therein are referred to as PCMCIA cards 25. However, the present invention is not intended to be limited to those devices to which PCMCIA cards 25 are attached.

The above-mentioned PCMCIA card 25 is designed so as to generate various control signals (timing signals), such as a reference clock PCLK having 13.5 MHz corresponding to each pixel of display data, a horizontal synchronous signal (HREF) and a vertical synchronous signal (VS) that are synchronous to the reference clock PCLK, and display data, YUV data, synchronous to these timing signals, and to supply them to the display control circuit 21 via the ZV port.

The YUV to RGB conversion circuit 35, which is a circuit for converting data of the YUV form into data of the RGB form, carries out, for example, the following operations:

$$R = Y + V \tag{1}$$

$$G = Y - 0.186\, U - 0.5\, V \tag{2}$$

$$B = Y + U \tag{3}$$

The RGB data, thus obtained, is inputted to the switching circuit 37 through the data bus 28, and when the switching circuit 37 is set on the card side, that is, the external input side, it is outputted from the switching circuit 37 to the data bus 30 in predetermined timing.

The control signals, released from the ZV port, are inputted to the control-signal timing adjustment circuit 36.

T he control-signal timing adjustment circuit 36 is provided with a circuit for generating a timing pulse signal of 13.5 MHz that is formed by a reference clock source (not shown) placed in the display control circuit 21. When the reference clock PCLK is being supplied from the ZV port, it outputs a pixel clock PXCLK in synchronism with the timing pulse signal, and when the reference clock PCLK is not supplied (when the PCMCIA card 25 is not attached), it outputs the timing pulse signal as a pixel clock PXCLK. In the same manner, the control-signal timing adjustment circuit 36 outputs a horizontal synchronous signal HSYNC and a vertical synchronous signal VSYNC. As will be described later in detail, the timing signal from the PCMCIA card 25 and the timing signal generated in the display control circuit 21 are synchronously adjusted with each other, and then supplied to the television signal encoder 24 and the liquid crystal display 22.

As described above, the control-signal timing adjustment circuit 36 generates the pixel clock PXCLK of 13.5 MHz suitable for the television-signal encoder 24, the vertical synchronous signal VSYNC and the horizontal synchronous signal HSYNC, and outputs these signals to the television-signal encoder 24 through the switching circuit 37. Moreover, the control signals, released from the control-signal timing adjustment circuit 36, are supplied to a control-signal timing generation circuit 33.

The control-signal timing generation circuit 33 is a circuit for generating various timing signals suitable for the liquid crystal display 22, for reading display data from the display memory 31, and for generating various timing signals for carrying out writing control, not shown.

More specifically, the control-signal timing generation circuit 33 generates the following signals: (1) a clock signal CLK of 13.5 MHz having the same phase as the pixel clock PXCLK utilized as a pixel clock for the liquid crystal display 22, which is generated based upon the pixel clock PXCLK of 13.5 MHz, the horizontal synchronous signal HSYNC and the vertical synchronous signal VSYNC that are outputted from the control-signal timing adjustment circuit 36; (2) a latch pulse LP which is synchronous to the horizontal synchronous signal HSYNC, and allows latch circuits (not shown) in the liquid crystal display 22 to latch display data; (3) a re-writing pulse CLS for outputting display data held in the latch circuit to each display element in the liquid crystal display 22; (4) a start pulse GSP used as a control signal for determining a display-starting line in the vertical direction in the liquid crystal display 22 (the start pulse GSP is generated in synchronized timing with line number 19 in raster scanning of the television receiver 23 in the present embodiment); (5) a control signal SPS for determining a display-starting dot position in the horizontal direction in the liquid crystal display 22; and (6) other control signals used for the liquid crystal display 22, such as REV and REVV0, which are inherently required for liquid crystal display (the explanation of which is omitted since not directly related to the present invention).

The control-signal timing generation circuit 33 further generates control signals for controlling writing and reading operation to and from the display memory 31 for storing display data that has generated in the portable information terminal or the personal computer. More specifically, in order to read display data from the display memory 31 successively starting from the leading line of a display area on the display screen, the control-signal timing generation circuit 33 generates signals causing address signals for the display memory 31 in synchronism with the above-mentioned timing signal, and supplies them to the readout counter 34. The readout counter 34 generates address signals for the display memory 31, and these address signals are used upon carrying out a writing or reading operation on or from the display memory 31. Moreover, control signals RAS, CAS and OE used for writing and reading on and from the display memory 31 are generated in synchronism with the timing signal, and supplied to the display memory 31.

In addition, the control-signal timing generation circuit 33 generates a latch signal DIO (see FIG. 3) used for latching display data (RGBOUT) that has read from the display memory 31 to the data bus 29 in a data input/output section DIOS (not shown) having latch circuits built in the switching circuit 37, in synchronism with the above-mentioned timing signal.

Display data is read from the display memory 31 in accordance with the latch signal DIO in 128 bits, and the display data is held in the data input/output section DIOS in the switching circuit 37. Further, the display data (RGBOUT) is simultaneously supplied to the television signal encoder 24 and the liquid crystal display 22 through the data bus 30.

Figure 3:
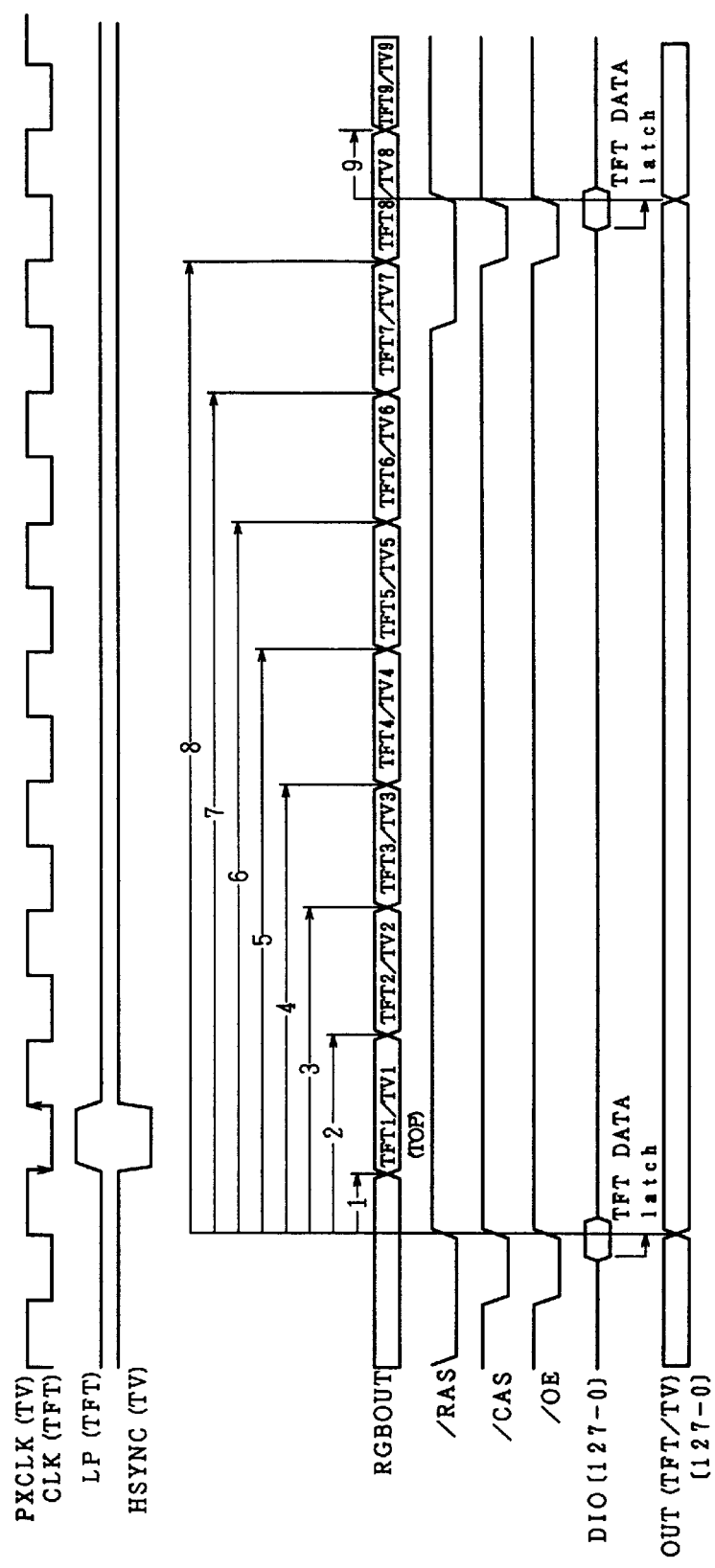
FIG. 3 is a waveform diagram that explains the scanning operation in the horizontal direction of the display control circuit shown in FIG. 2.
Figure 4:
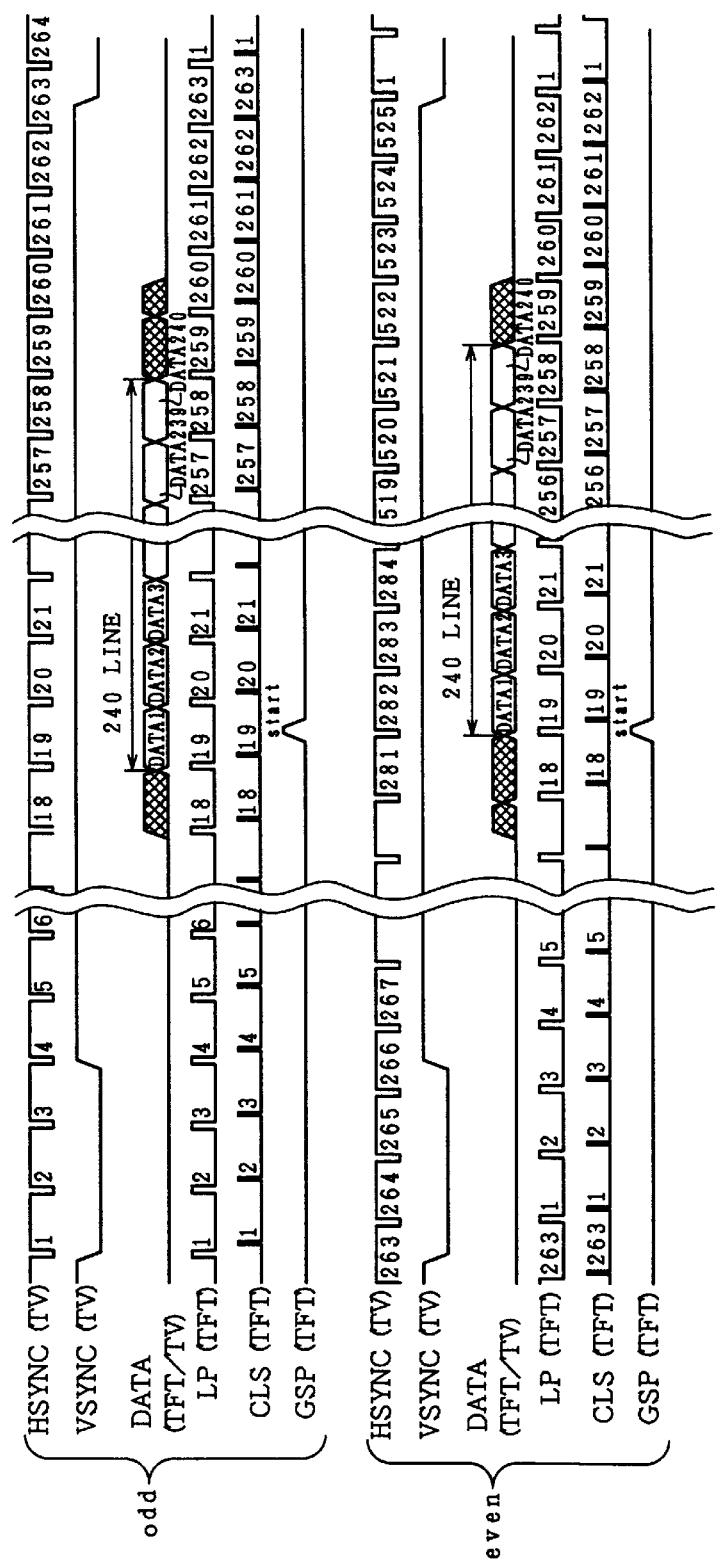
FIG. 4 is a waveform diagram that explains the scanning operation in the vertical direction of the display control circuit shown in FIG. 2.

Here, what is noted is that, as shown in FIGS. 3 and 4, the various timing signals are generated in synchronizing relationships with each other. In other words, in the present embodiment, among the timing signals, the pixel clock PXCLK and the clock signal CLK are timing pulse signals of 13.5 MHz having the same phase, and the horizontal synchronous signal HSYNC supplied to the television signal encoder 24 and the latch pulse LP supplied to the liquid crystal display 22 are generated so as to have the same phase. Moreover, as shown in FIG. 3, the display data, read from the display memory 31, is latched by the latch signal DIO in synchronism with the synchronous signal.

Furthermore, the timing in which the latching is made by the latch circuit inside the liquid crystal display 22 is synchronized so that it is started from line number 19 in raster scanning in the television receiver 23; thus, display data being displayed on the screen of the liquid crystal display 22 is fixed approximately in the center position of the screen of the television receiver 23.

As described above, the control-signal timing generation circuit 33 generates control signals suitable for the liquid crystal display device 22, such as the clock CLK of 13.5 MHz, the latch pulse LP, the rewriting pulse CLS, etc., and outputs them to the liquid crystal display device 22. The liquid crystal display device 22 is, for example, a liquid crystal display device of the active matrix type having 320 dots×240 dots suitable for the afore-mentioned ¼ VGA, in which TFTs (thin-film transistors) are installed.

The display memory 31, which is a video memory that is realized by a random access memory, etc., can maintain display data of 5 bits, 6 bits and 5 bits for the respective colors of R, G and B in each of the pixels of 320×240 dots, so as to be suitable for the liquid crystal display device 31. The contents of storage of the display memory 31, which are updated based upon the results of operations of the processing unit, are inputted to the switching circuit 37 through the data bus 29, and then outputted to the data bus 30 when the switching circuit 37 is set on the display memory 31 side. The reading operation of the contents of store of the display memory 31 is realized as follows: The address signal, released from the control-signal timing generation circuit 33, is counted by the readout counter 34 in response to the control signals in predetermined timing, that is, for example, after a lapse of a predetermined scanning period from the receipt of the vertical synchronous signal VSYNC, and the store region corresponding to the counted value is subjected to the reading operation.

The ON/OFF circuits 38, 39 and 40 generate ON/OFF outputs in response to the setting state of a CPU 26 serving as the processing unit. The ON/OFF circuits 38, which allows the television-signal encoder 24 to carry out image-quality changes such as edge emphasis, carry out switching of analog filter characteristics in accordance with motion images and still images respectively. The ON/OFF circuit 39 is used to provide the OFF setting so as to stop the television-signal encoder 24 after a lapse of a predetermined time period. The ON/OFF circuit 40 is used to make a selection as to whether or not the state of the switching circuit 37 should be switched to the input from the PCMCIA card 25 attached to the ZV port.

In the case when the PCMCIA card 25 is attached, upon receipt of selection and instruction so as to display display data from the PCMCIA card 25 on both the television receiver 23 and the liquid crystal display 22 by the software or the operator of the portable information terminal or the personal computer, the switching circuit 37 turns the ON/OFF circuit 40 on, making the data bus 28 effective so as to output the display data from the PCMCIA card 25, as well as making a switchover so as to output the display data to the data bus 30.

In contrast, upon receipt of selection and instruction so as not to display display data from the PCMCIA card 25 on the television receiver 23 and the liquid crystal display 22, the switching circuit 37 turns the ON/OFF circuit 40 off, making the data bus 29 effective so as to output the display data read from the display memory 31, as well as making a switchover so as to output the display data to the data bus 30 through the latch circuit in the data input/output section DIOS.

FIGS. 3 and 4 are waveform diagrams that explain the operation of the display control circuit 21 having the above-mentioned construction. FIG. 3 is a waveform diagram that explains the scanning operation in the horizontal direction with respect to the display screen, and FIG. 4 is a waveform diagram that explains the scanning operation in the vertical direction with respect to the display screen. The example, shown in FIG. 3, explains a reading operation related to RGB data on line number 1 in the display memory 31.

As shown in FIG. 3, the control-signal timing generation circuit 33 generates the horizontal synchronous signal HSYNC and the latch pulse LP respectively based upon the pixel clock PXCLK and the clock CLK that are mutually synchronous or vary in mutually different timing (which are synchronous in the example of FIG. 3). The control-signal timing generation circuit 33 generates a signal for allowing DRAM readout data DIO to be latched, thereby allowing a data input/output section DIOS in the switching circuit 37 to latch RGB data corresponding to 128 bits in timing in which control signals /RAS, /CAS and /OE, generated based upon the clocks PXCLK and CLK are synchronized.

The switching circuit 37 parallel-outputs the RGB data corresponding to 128 bits that has been latched by the data input/output section DIOS from an output RGBOUT to the data bus 30 corresponding to 18 bits in synchronism with the clocks PXCLK and CLK. In FIG. 3, the pieces of RGB data (each having a 16-bit format) outputted from the output RGBOUT of the switching circuit 37 to the data bus 30 are represented by TFT1/TV1, TFT2/TV2, . . . , etc.; this indicates that RGB data TFT1 on the first pixel of the liquid crystal display device 22 is mutually equal to RGB data TV1 on the first pixel of the television receiver 23. On both of the liquid crystal display device 22 and the television receiver 23, image display, which is represented by OUT (TFT/TV), is carried out.

Here, the figures of 1 through 8 and 9 of the RGBOUT signals in the Figure represent the order of pixels. In other words, the display data of 128 bits, which has been read from the display memory 31 and latched in the data input/output section DIOS, is successively outputted to the data bus 30 as RGB data with 128 bits of 1 through 8, each having the 16-bit format per pixel. Thus, a displaying operation having 320 pixels per line is carried out by repeating this process.

The liquid crystal display device 22 and the television-signal encoder 24 respectively acquire data in timing in which the clocks CLK and PXCLK respectively rise. When these clocks CLK and PXCLK, individually transferred, are synchronous to each other as described above, these terminals may be provided as a commonly-used terminal.

As described above, inside the display memory 31, the RGB data is maintained with 5 bits for each of R and B and 6 bits for G, or a total of 16 bits in each pixel, and upon outputting the RGB data from the switching circuit 37, one redundant bit is added to each of the R and B data so that data of 6 bits is provided for each of the colors R, G and B. Thus, the number of available colors becomes $2^{16}=65000$. Moreover, the data reading operation from the display memory 31 to the switching circuit 37 may be carried out successively, or may be carried out by reading the above-mentioned 128 (bits)=16 (bits/dot)×8 (dots) as one lot. In this case, the number of accesses is positively reduced so that the consumption of power can be reduced.

In FIG. 4 and other Figures which will be referred to later so as to show the scanning timing in the vertical direction, "odd" represents the odd field of the television receiver 23, and "even" represents the even field thereof. From the control-signal timing adjustment circuit 36 to the television-signal encoder 24, the vertical synchronous signal VSYNC is released in predetermined timing of the horizontal synchronous signal HSYNC (during periods between line number 1 and line number 3 and between line number 263 and line number 266 in the example of FIG. 4).

From the control-signal timing generation circuit 33 to the liquid crystal display device 22, a latch pulse LP, which provides proper timing for allowing the driver circuit to store data corresponding to one line in synchronized timing with the horizontal synchronous signal HSYNC, is outputted, and in response to this pulse, the liquid crystal display device 22 acquires RGB data. The RGB data thus acquired is written onto a display element of each dot in accordance with the writing pulse CLS. The liquid crystal display device 22 starts a displaying operation from line number 1 in response to the start pulse GSP that corresponds to the vertical synchronous signal VSYNC of the television receiver 23.

Here, what is noted is that the display capacity of the liquid crystal display 22 is 240 lines, while that of the television receiver 23 is approximately 230 lines the number of which shows those lines that are displayed on the screen except for the vertical blanking period and upper and lower non-displaying periods among 262 lines (ODD) or 263 lines (EVEN) of one field of the television receiver 23; therefore, there is a difference of ten lines between them. In order to solve this problem, the RGB data on line number 1, indicated by "DATA 1", is released from pulse number 19 and pulse number 282 of the horizontal synchronous signal HSYNC. As described above, the liquid crystal display device 22 starts image display from line number 1 in response to the start pulse GSP, while the television receiver 23 starts image display from line number 19 and line number 282. Consequently, in the vicinity of center lines in the vertical direction in the television receiver 23, that is, in the vicinity of line number 131 and line number 393, image data corresponding to line number 120 in the liquid crystal display device 22 is displayed. Therefore, the television receiver 23 is allowed to carry out image display with its center in the vertical direction virtually coinciding with that of the liquid crystal display device 22, only with data loss of approximately 5 lines in respective upward and downward directions.

Figure 5:
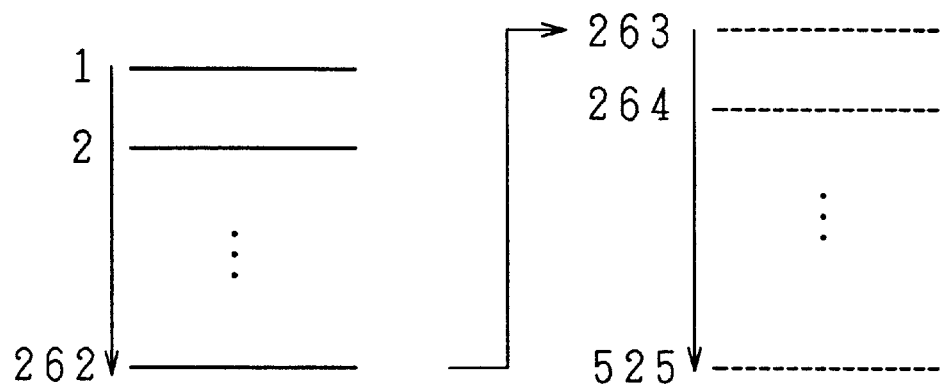
FIG. 5 is an explanatory drawing that shows an example of a television display that is made by the display control circuit of FIG. 2.
Figure 6:
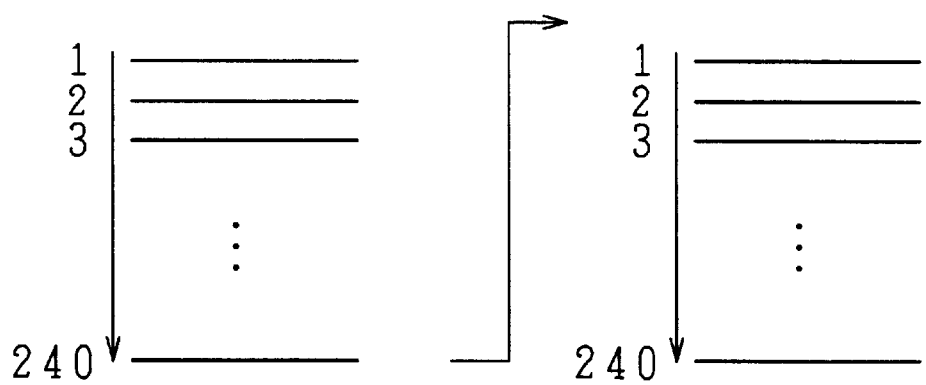
FIG. 6 is an explanatory drawing that shows an example of a liquid-crystal display that is made by the display control circuit of FIG. 2.

Therefore, during one frame in which an interlace scanning operation as shown in FIG. 5 is carried out in the television receiver 23, a non-interlace scanning operation as shown in FIG. 6 is carried out in the liquid crystal display device 22.

In other words, FIG. 5 explains raster scanning of the television receiver 23; and odd fields in interlace scan are shown on the left side, and even fields therein are shown on the right side. Here, figures in FIG. 5 indicate scanning lines. Moreover, line 24 and thereafter in the odd fields and line 287 and thereafter in the even fields are set as the effective area for display.

FIG. 6 shows display lines in non-interlace scan in the liquid crystal display 22; and the first frame is shown on the left side, and the second frame is shown on the right side. In other words, when the odd field is displayed on the television receiver 23, the first frame is displayed on the liquid crystal display 22, and when the even field is displayed on the television receiver 23, the second frame is displayed on the liquid crystal display 22 in the same manner. Here, figures in FIG. 6 indicate line numbers of the liquid crystal display 22.

In accordance with the display timing of the present embodiment, when line number 19 in raster scanning is displayed on the television receiver 23, the RGB data (DATA1) of the first line is displayed on the liquid crystal display 22.

After an address has been set based upon a readout control signal from the control-signal timing generation circuit 33, the corresponding access is made onto the display memory 31; and as shown in FIG. 4, the readout control is successively carried out from the leading portion of the display memory 31 in response to the line number 19 of the horizontal synchronous signal HSYNC so that RGBOUT as shown in FIG. 3 is outputted to the data bus 30.

The television receiver 23, although it differs depending on the makers, is designed so that, in the odd field, line number 24 (the 24-th line) and thereafter in raster scanning are displayed as an effective area displayed on the display screen. Therefore, 5 lines of display data from the display memory 31 (the display data located from line number 19 to line number 23) is not displayed. In contrast, displaying is carried out from the first line on the liquid crystal display 22. Thus, the difference in number of lines between the television receiver 23 and the liquid crystal display 22 is absorbed so that it becomes possible to display the same display data at the same time.

Moreover, the television receiver 23 is also designed so that, in the even field, line number 287 (the 287-th line) and thereafter in raster scanning are displayed as an effective area displayed on the display screen. Therefore, 5 lines of display data from the display memory 31 (the display data located from line number 282 to line number 286) is not displayed. In contrast, displaying is carried out from the first line on the liquid crystal display 22. Therefore, in the liquid crystal display 22, the same display data between the odd field and the even field of the television receiver 23 is displayed so that display data corresponding to one line of the display memory 31 is displayed in a manner so as to bridge two lines.

Figure 17:
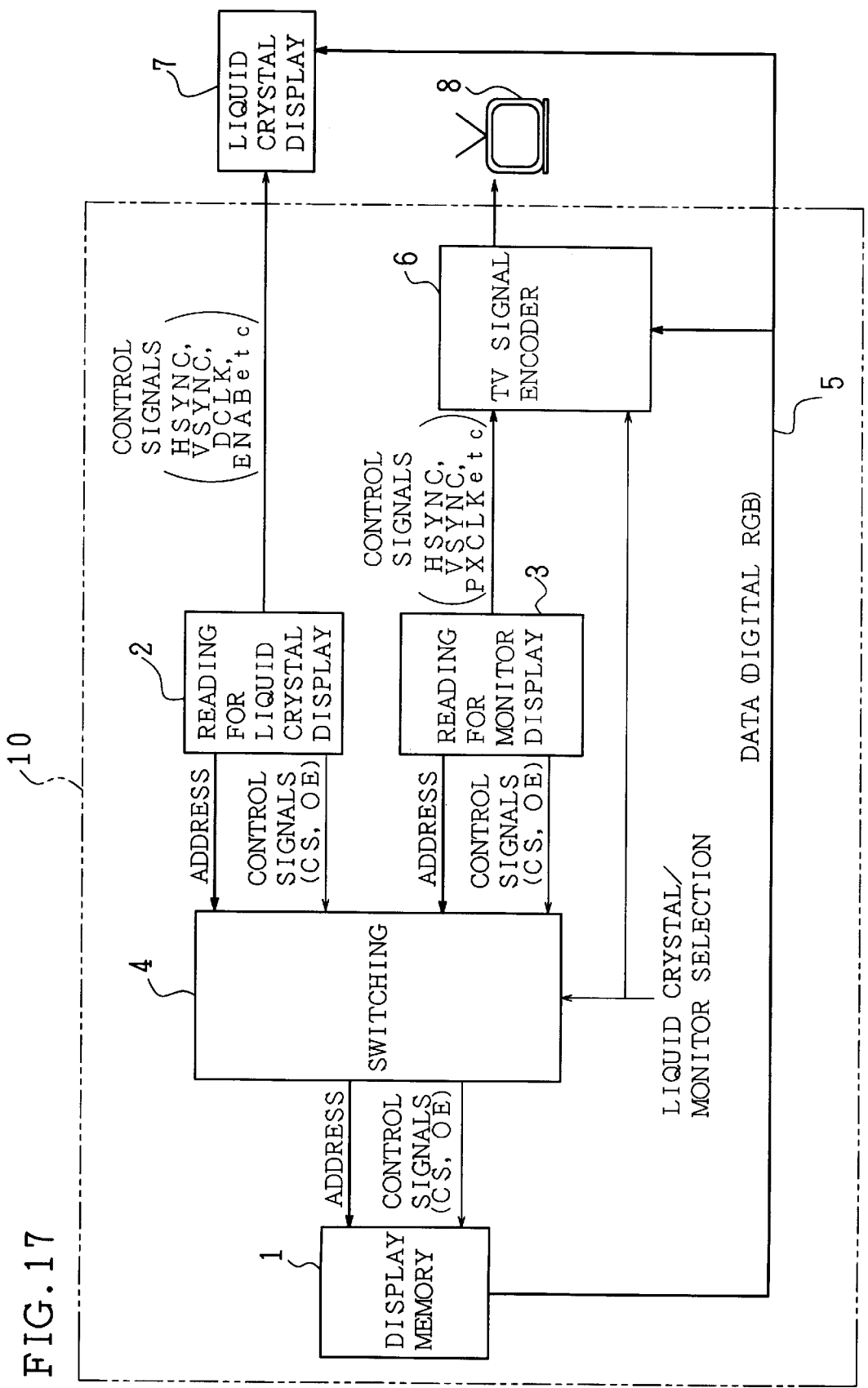
FIG. 17 is a block diagram that schematically shows a typical conventional construction for image display.
Figure 18:
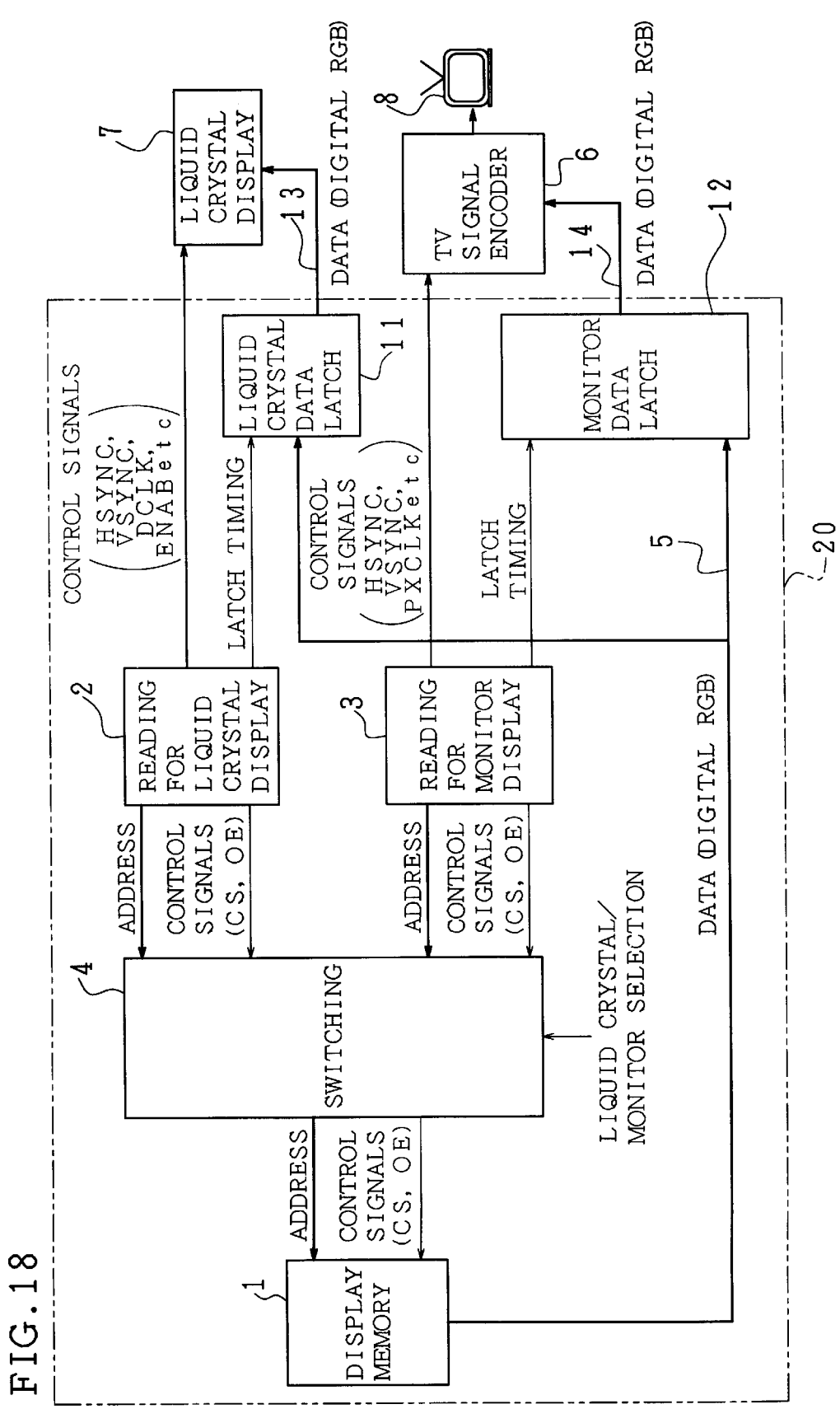
FIG. 18 is a block diagram that schematically shows another conventional construction for image display.

As described above, the same image display is carried out simultaneously by giving the individual control signals to the liquid display device 22 and the television-signal encoder 24 and using the same RGB data, that is, using the common display memory 31. Therefore, even in the case when the television-signal encoder 24 is provided as a device different from the display control circuit 21, the number of terminals of the display control circuit 21 constituted by integrated circuits is reduced by commonly using the data bus 30, and the reading circuits 32, that is, the control-signal timing generation circuit 33 and the readout counter 34, can be reduced to one circuit; thus, the construction can be simplified to a great degree as compared with the display control circuits 10 and 20 shown in FIGS. 17 and 18.

Referring to FIGS. 7 through 11, the following description will discuss the second embodiment of the present invention.

Figure 7:
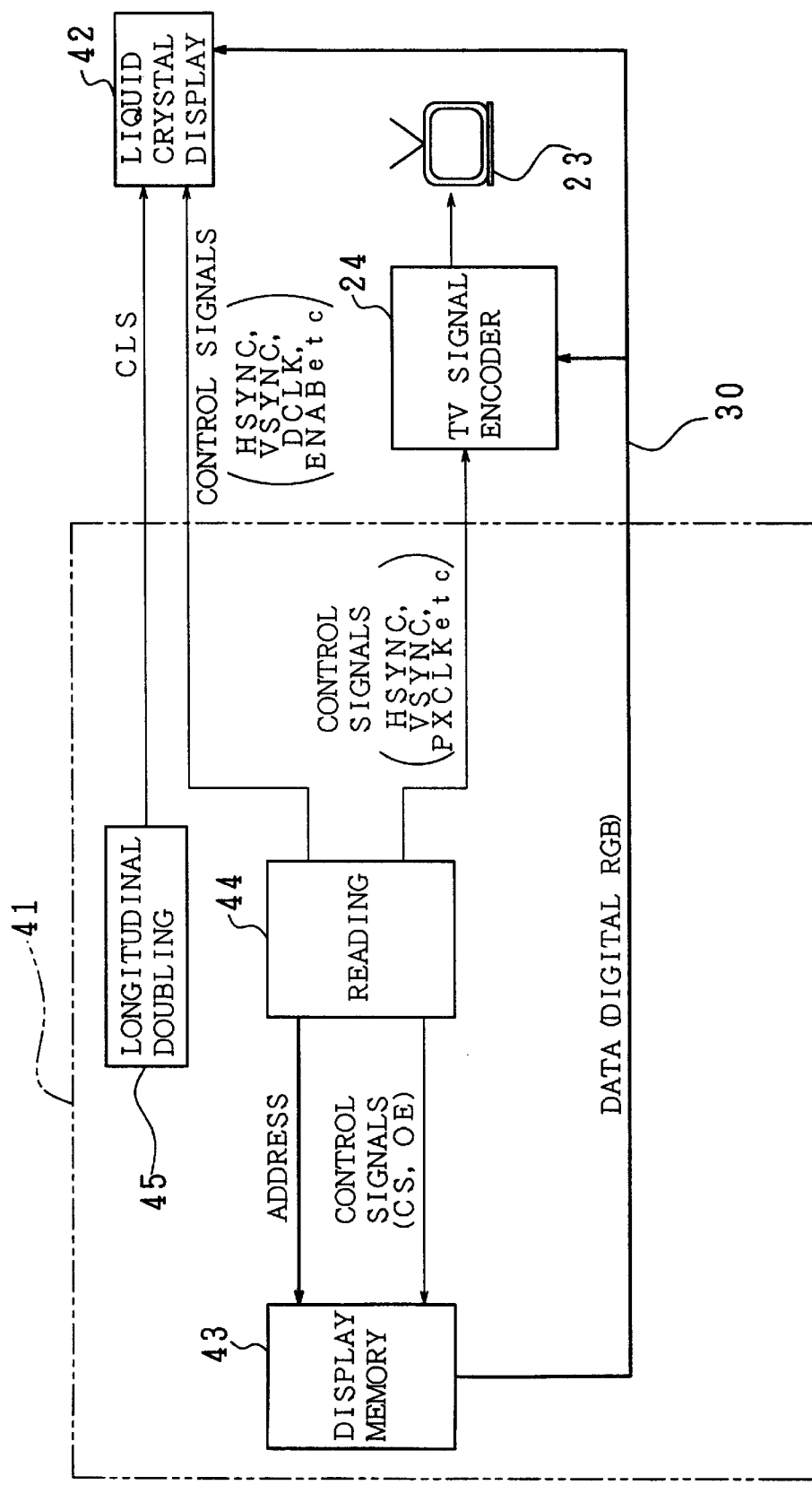
FIG. 7 is a block diagram that schematically shows the construction for image display of the second embodiment of the present invention.

FIG. 7 is a block diagram that shows a schematic construction of the second embodiment of the present invention. In the construction of FIG. 7, those portions similar to and corresponding to the constructions of FIGS. 1 and 2 are indicated by the same reference numerals and the description thereof is omitted. In this construction, a liquid crystal 42, installed integrally with a display control circuit 41, and a display memory 43 (which corresponds to the display memory 31 of the first embodiment) inside the display control circuit 41 has VGA-compatible 640 dots×480 dots. For this reason, as compared with the effective scanning lines, 230, of the television receiver 23 of the NTSC system, the number of its scanning lines is approximately double, and a longitudinal doubling circuit 45 is installed in the display control circuit 41. The longitudinal doubling circuit 45 doubles the frequency of the re-writing pulse CLS that is outputted from the reading circuit 32 to the liquid crystal display 22 in the aforementioned first embodiment, and then outputs the resulting pulse to the liquid crystal display device 42.

With respect to the RGB data stored inside the display memory 43, the reading circuit 44, upon scanning the odd field of the television receiver 23, specifies addresses of RGB data on the odd lines (DATA1, DATA3, . . . , DATA479), and, upon scanning the even field, specifies addresses of RGB data on the even lines (DATA2, DATA4, . . . , DATA480); thus, the resulting data is outputted to the liquid crystal display device 42 and the television-signal encoder 24 through the data bus 30.

Figure 8:
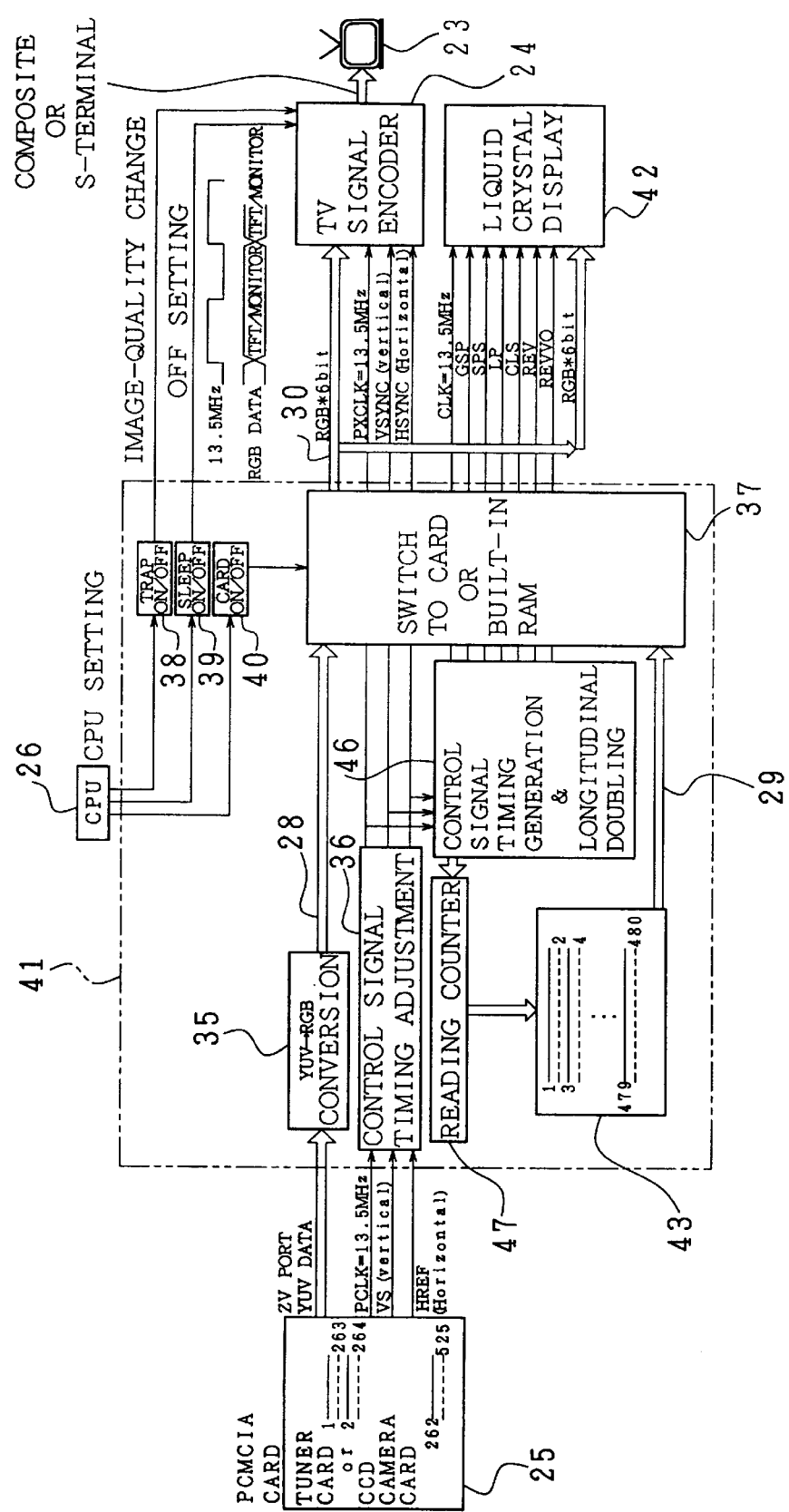
FIG. 8 is a block diagram that schematically shows a specific construction of the display control circuit shown in FIG. 7.

FIG. 8 is a block diagram that specifically shows the display control circuit 41 shown in FIG. 7. In FIG. 8, those parts corresponding to FIG. 7 and FIG. 2 are indicated by the same reference numerals. The above-mentioned reading circuit 44 and the longitudinal doubling circuit 45 is realized by a control-signal timing generation/longitudinal doubling circuit 46. A readout counter 47 allows the display memory 43 to output RGB data in accordance with the read addresses from the control-signal timing generation/longitudinal doubling circuit 46.

Figure 9:
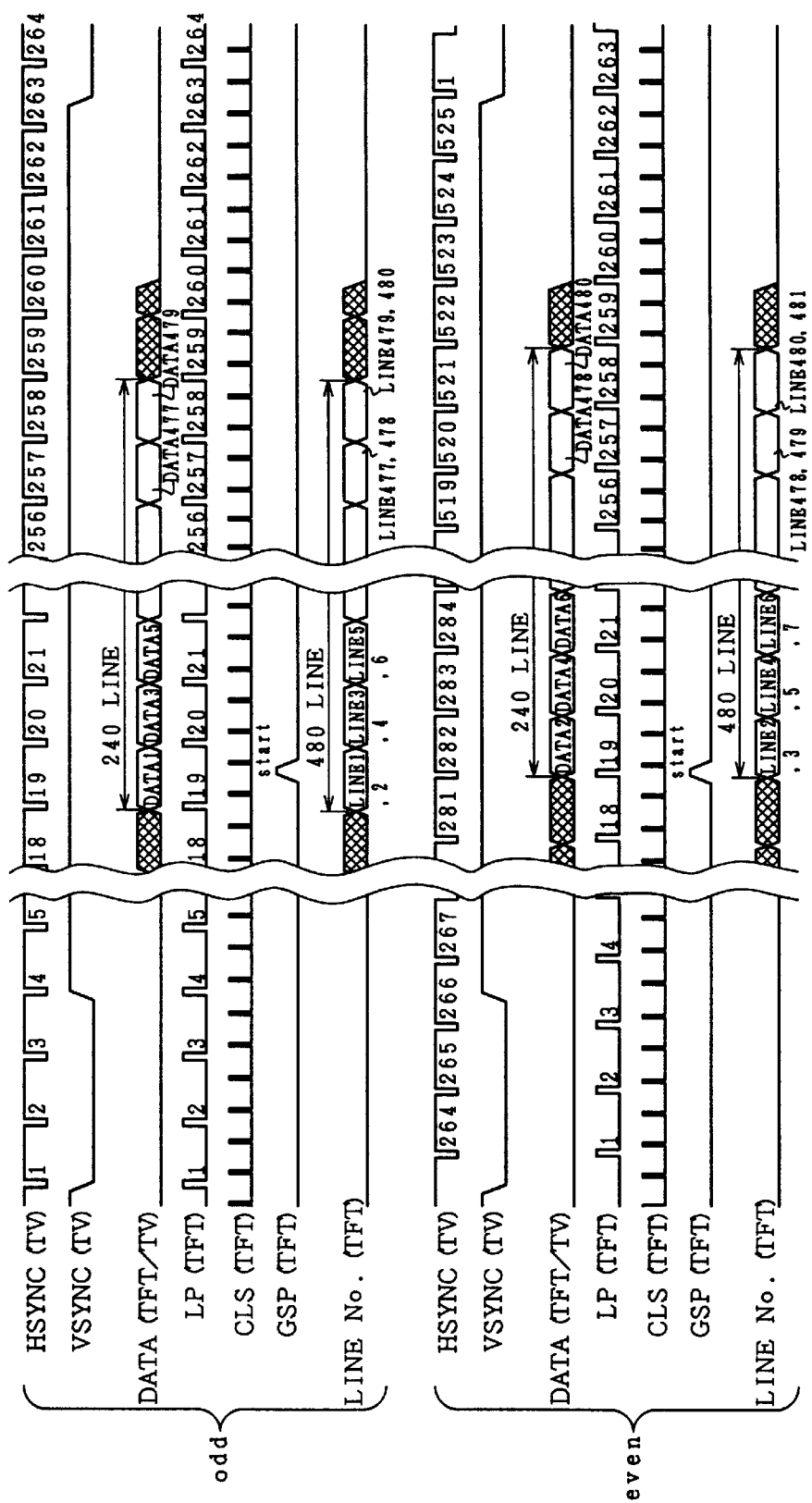
FIG. 9 is a waveform diagram that explains the scanning operation in the vertical direction of the display control circuit shown in FIG. 8.

The scanning operation in the horizontal direction is the same as that shown in FIG. 3, and the scanning operation in the vertical direction is explained by FIG. 9. Here, in FIG. 9, those parts corresponding to FIG. 4 are also indicated by the same reference numerals and the description thereof is omitted. The readout counter 47 is designed so as to generate an address signal in synchronism with the interlace scanning operation; that is, the address signal of the display memory 43 is generated in association with the respective fields of the odd field period and the even field period. Moreover, the display memory 43 reads out display data in synchronism with the interlace scanning operation from line number 19 or line number 282 of the horizontal synchronous signal HSYNC based upon a readout control signal from the control-signal timing generation/longitudinal doubling circuit 46, and outputs it to the data bus 29. The present arrangement is different from the aforementioned arrangement shown in FIG. 4 in this point.

As clearly explained by FIG. 9, with respect to one pulse of the horizontal synchronous signal HSYNC for the television receiver 23, the latch pulse LP to the driver circuit of the liquid crystal display device 42 is one pulse in the same manner as FIG. 4, while the writing pulse CLS to the display element has two pulses.

With respect to one pulse of the horizontal synchronous signal HSYNC, two pulses of the re-writing pulse CLS are outputted to each display element; therefore, in each field, data corresponding to one line, latched by the driver circuit, is outputted to two consecutive lines of the display element. For example, in the odd field, DATA1 of RGB data is displayed on both line number 1 and line number 2 and DATA3 of RGB data is displayed on both line 3 and line 4, while in the even field, DATA2 of RGB data is displayed on both line number 1 and line number 2, and DATA4 of RGB data is displayed on both line number 3 and line number 4 (see FIG. 9).

Moreover, although the reading operation of RGB data is started from number 19 in the odd field and from number 282 in the even field of the horizontal synchronous signal HSYNC in the same manner as FIG. 4, RGB data on the odd lines (DATA1, DATA3, . . . , DATA479) are successively read out upon reading the odd field of the television receiver 23, and RGB data on the even lines (DATA2, DATA4, . . . , DATA480) are successively read out upon reading the even field thereof with respect to the RGB data in the display memory 43; thus, the present embodiment differs from the first embodiment in this point.

Figure 10:
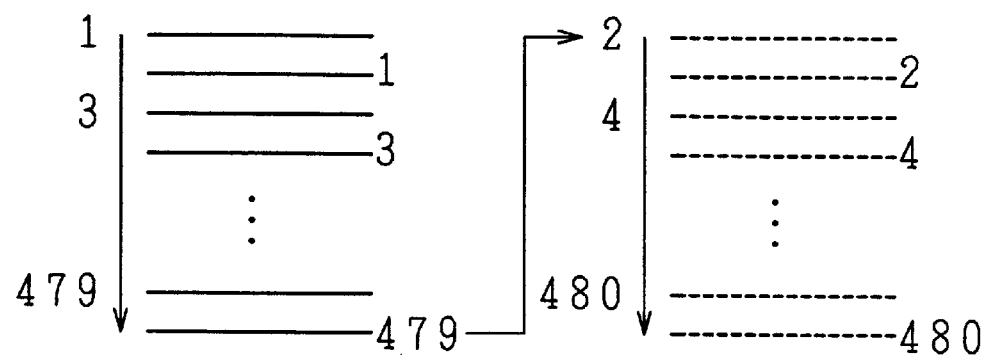
FIG. 10 is an explanatory drawing that shows an example of a liquid-crystal display that is made by the display control circuit of FIG. 8.

With this arrangement, the aforementioned image display by means of the interlace scanning system as shown in FIG. 5 is carried out on the television receiver 23, and image display by means of the non-interlace scanning system as shown in FIG. 10 is carried out on the liquid crystal display device 42 with a pseudo vertical resolution of 480=240×2 scans.

FIG. 10 shows display lines in non-interlace scanning in the liquid crystal display 42. Here, while the odd field is displayed on the television receiver 23, RGB data (DATA1, DATA3, . . . , DATA479) on the odd line is displayed on the liquid crystal display 42, and while the even field is displayed on the television receiver 23, RGB data (DATA2, DATA4, . . . , DATA480) on the even line is displayed on the liquid crystal display 42. Additionally, figures in FIG. 10 represent corresponding RGB data read out line by line.

In accordance with the display timing of the present embodiment, the difference in number of lines is absorbed between the television receiver 23 and the liquid crystal display 42, making it possible to display the same display data at the same time, in the same manner as the aforementioned first embodiment.

As described above, even when the liquid crystal display 42 (the liquid crystal display 42 having the longitudinally doubled circuit), which is integrally installed with the display control circuit 41 provided with the display memory 43 having VGA compatible 640×480 dots, is used, it is possible to carry out image display by using the same RGB data as the television receiver 23.

Figure 11:
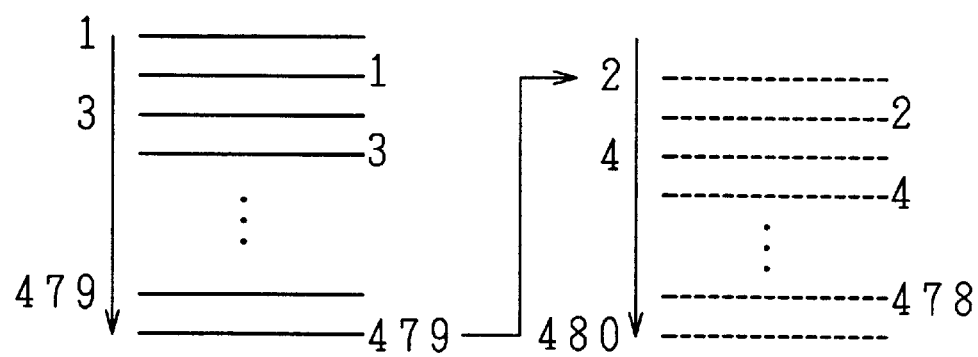
FIG. 11 is an explanatory drawing that shows another example of a liquid-crystal display that is made by the display control circuit of FIG. 8.

Here, as illustrated in FIG. 11, in the liquid crystal display device 42, by shifting data by one line (by starting with line number 2 in the even field upon displaying) upon scanning operation regarding the even field of the television receiver 23, the image display becomes less susceptible to flickers by the after-image effect of liquid crystal.

Additionally, in the control-signal timing generation/longitudinal doubling circuit 46, the operation of the control-signal timing generation is carried out in the same manner as the control-signal timing generation circuit 33 in the aforementioned first embodiment.

Referring to FIGS. 12 through 16, the following description will discuss the third embodiment of the present invention.

Figure 12:
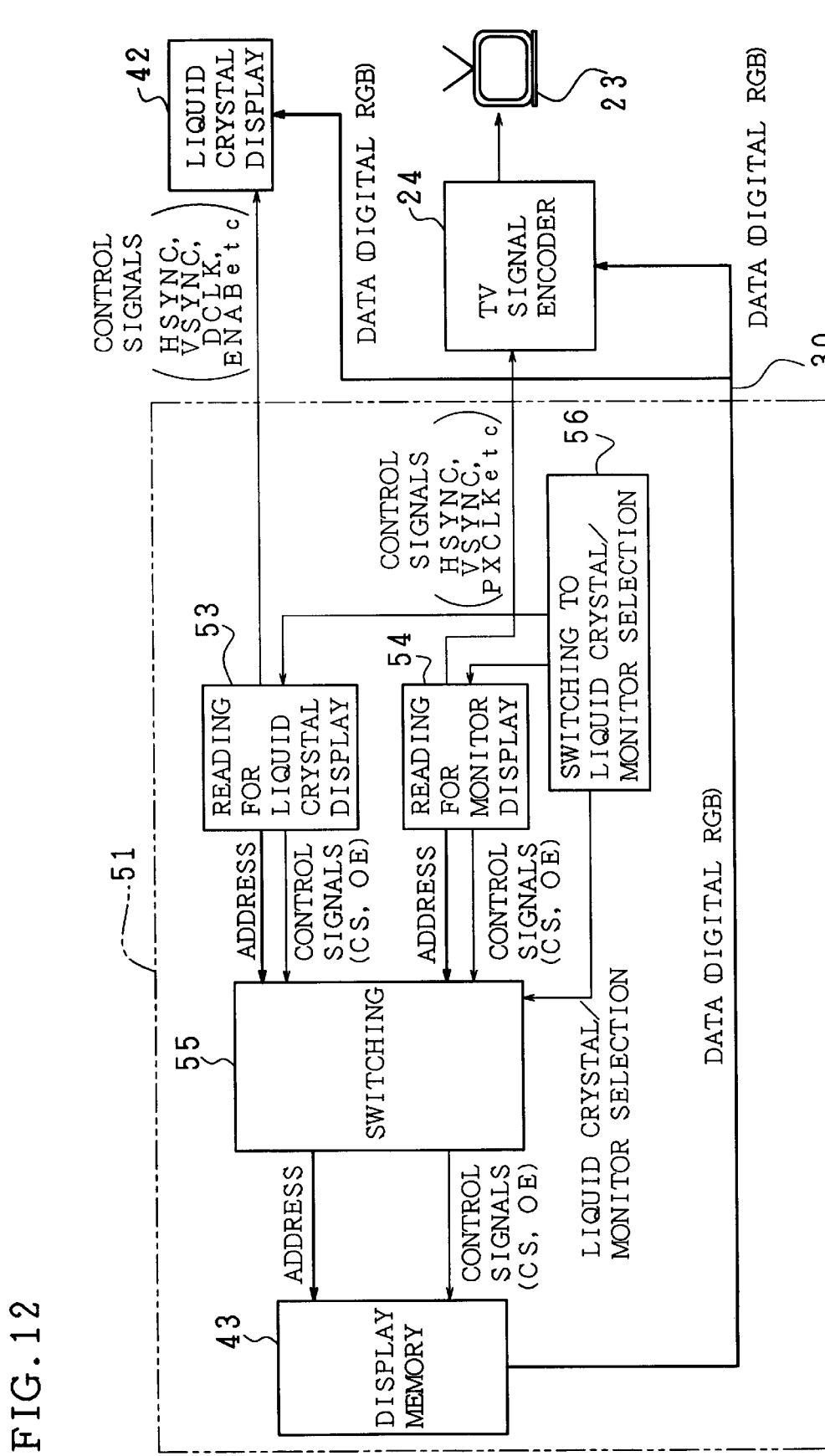
FIG. 12 is a block diagram that schematically shows the construction for image display of the third embodiment of the present invention.

FIG. 12 is a block diagram that shows a schematic construction of the third embodiment of the present invention. In the construction of FIG. 12, those parts that have the same constructions and that are shown in FIGS. 1 and 2 as well as FIGS. 7 and 8 are indicated by the same reference numerals and the description thereof is omitted. In this construction, in the same manner as FIG. 7, the liquid crystal display device 42 and the display memory 43 have VGA-compatible 640 dots×480 dots. As compared with the display control circuit 41 shown in FIG. 7 which reads the same RGB data twice for the liquid crystal display device 42 with the vertical resolution being reduced to approximately ½, a display control circuit 51, shown in FIG. 12, reads the RGB data from the display memory 43 in a time-division multiplex manner and allows the liquid crystal display device 42 to carry out image displaying equivalent to VGA-full spec.

For this reason, a liquid-crystal-display reading circuit 53, a monitor-display reading circuit 54, a switching circuit 55 and a liquid-crystal/monitor selection switching circuit 56 are installed in the display control circuit 51.

The liquid-crystal-display reading circuit 53 outputs control signals, such as the horizontal synchronous signal HSYNC, vertical synchronous signal VSYNC, data clock DCLK and enable signal ENAB, to the liquid crystal display device 42, and also outputs control signals, such as the address signal, chip select signal CS and output enable signal OE, to the switching circuit 55. The monitor-display reading circuit 54 outputs control signals, such as the horizontal synchronous signal HSYNC, vertical synchronous signal VSYNC and pixel clock PXCLK, to the television-signal encoder 24, and also outputs control signals, such as the address signal, chip select signal CS and output enable signal OE, to the switching circuit 55. In response to the selection signal from the liquid-crystal/monitor selection switching circuit 56, the switching circuit 55 switches the address signal and control signal from the liquid-crystal-display reading circuit 53 and the address signal and control signal from the monitor-display reading circuit 54 in a time-division manner, thereby outputting the resulting signals to the display memory 43.

Therefore, from the display memory 43 to the data bus 30, pieces of RGB data, respectively used for the liquid crystal display device 42 and the television receiver 23, are outputted in a time-division multiplex manner, and the pieces of RGB data are selectively acquired by the liquid crystal display device 42 and the television-signal encoder 24 in accordance with the signals from the liquid-crystal-display reading circuit 53 and the monitor-display reading circuit 54.

Figure 13:
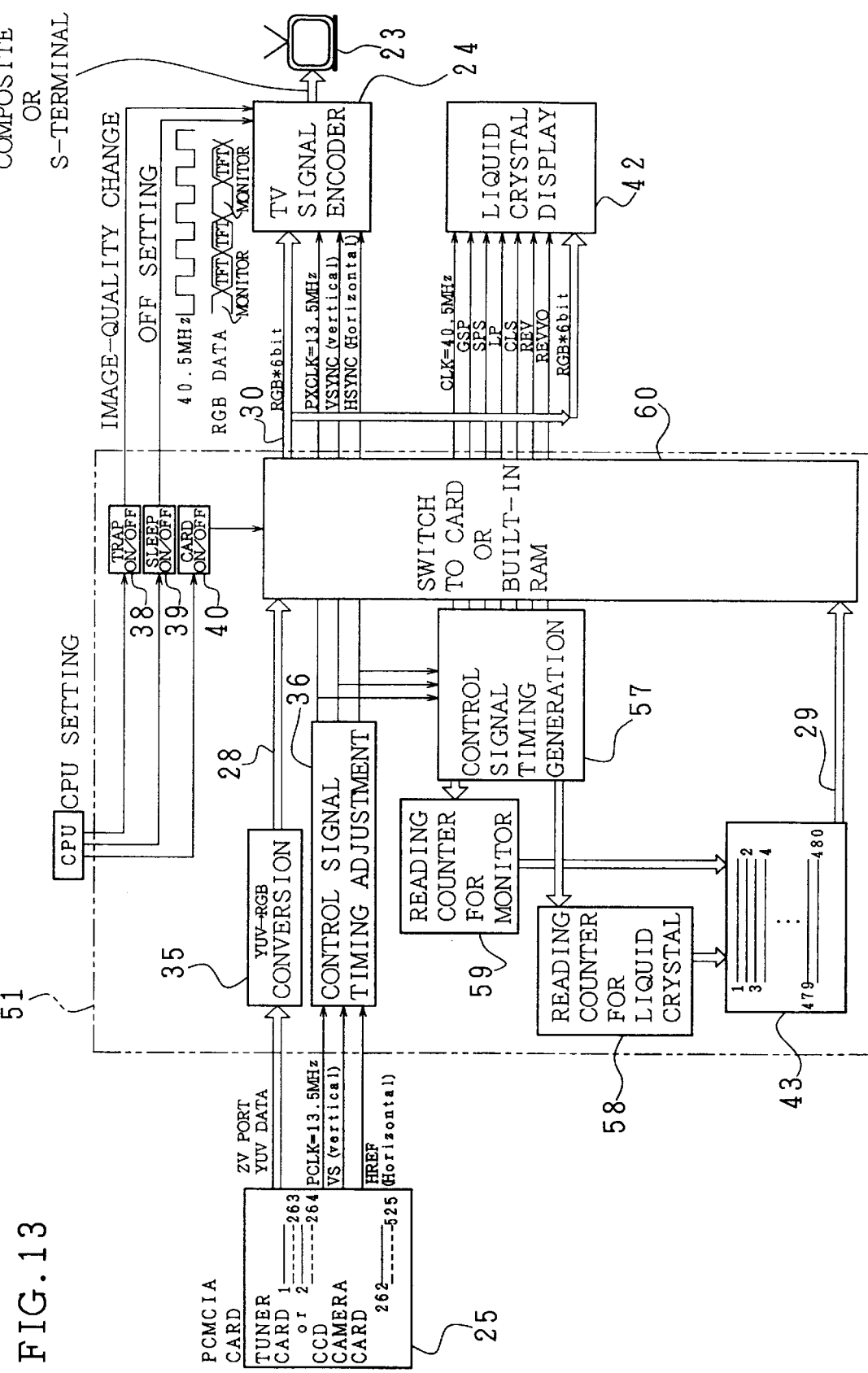
FIG. 13 is a block diagram that schematically shows a specific construction of the display control circuit shown in FIG. 12.

FIG. 13 is a block diagram showing a specific construction of the display control circuit 51. In FIG. 13, those parts that have the same constructions and that are shown in FIGS. 8 and 2 are indicated by the same reference numerals and the description thereof is omitted. A control-signal timing generation circuit 57 generates a control signal in suitable timing for the liquid crystal display device 42 in accordance with the reading circuits 53 and 54 and the switching circuits 55 and 56, and outputs it through the switching circuit 60. The control-signal timing generation circuit 57 also generates address signals, and allows the liquid crystal reading counter 58 and monitor reading counter 59 to read RGB data located at the desired addresses in the display memory 43 individually and to respectively output the data to the switching circuit 60 where the data is subjected to the time-division multiplex and outputted to the data bus 30. The liquid crystal reading counter 58 and monitor reading counter 59 generate address signals for the display memory 43, and these address signals are used for writing or reading display data on or from the display memory 43. The switching circuit 60 has the same functions as the switching circuit 37 described in the aforementioned first embodiment.

Figure 14:
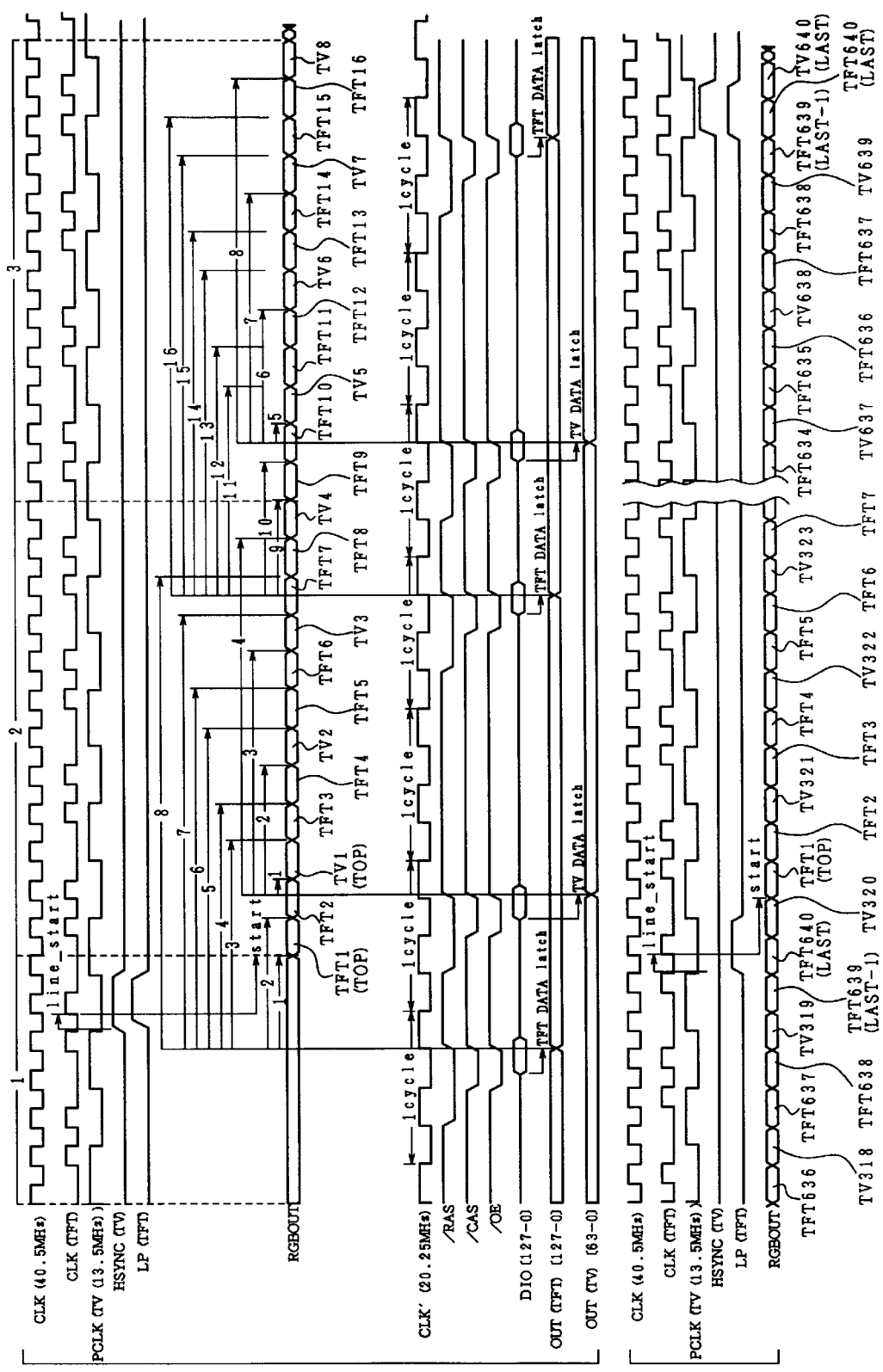
FIG. 14 is a waveform diagram that explains the scanning operation in the horizontal direction of the display control circuit shown in FIG. 13.

FIG. 14 is a waveform diagram that explains the scanning operation in the horizontal direction of the display control circuit 51 having the above-mentioned construction. In the display control circuit 51, the reference clock CLK is set at 40.5 MHz that is three times the pixel clock PXCLK of 13.5 MHz used for the television-signal encoder 24. Therefore, the clock CLK used for the liquid crystal display device 42 is also set at 40.5 MHz. Here, only two clocks among the three clocks are made effective, while one clock serves as an irregular clock fixed to Lo (low level); thus, the data transfer rate by the clock CLK is set at 27 MHz. With respect to RGBOUT shown in FIG. 14, figures given together with arrows represent corresponding numbers of display data (display pixels) in the display memory (the same as No. of RGBOUT).

The control-signal timing generation circuit 57 successively latches TFT data or TV data from the display memory 43 to the switching circuit 60 in rising timing of the aforementioned control signals /RAS, /CAS, and /OE so that the resulting data is outputted to the data bus 30 in a frequency of 13.5 MHz with one block being formed by two pieces of the TFT data and one piece of TV data.

The control signals /RAS, /CAS and /OE, which are formed in accordance with the clock CLK' of 20.25 MHz, are designed so that they become Lo-active for continuous two cycles with one cycle corresponding to two clocks of the clock CLK', and after a pause of one cycle, again becomes Lo-active for continuous two cycles.

Moreover, the horizontal synchronous signal HSYNC becomes Hi(high level)-active once after receipt of TV data of 640 dots, that is, TFT data of 1280 dots, and the latch pulse LP becomes Hi-active after receipt of every 320 dots of TV data, that is, every 640 dots of TFT data. Consequently, as illustrated in FIG. 14, during a transfer time of two lines of TFT data, a transfer operation of 1 line of TV data is carried out.

Additionally, with respect to the reading operation of RGB data from the display memory 43 to the switching circuit 60, data corresponding to 16 bits×8 dots can be read for each of TFT and TV as described earlier; however, in the construction of FIG. 14, the TV data is read 4 dots by 4 dots with the reading period being coincident with the TFT data. Thus, the temporary storage resistors can be reduced. Moreover, if an attempt is made to acquire TV data 8 dots by 8 dots, the TV data is read once in every two data readings of the TFT data.

Figure 15:
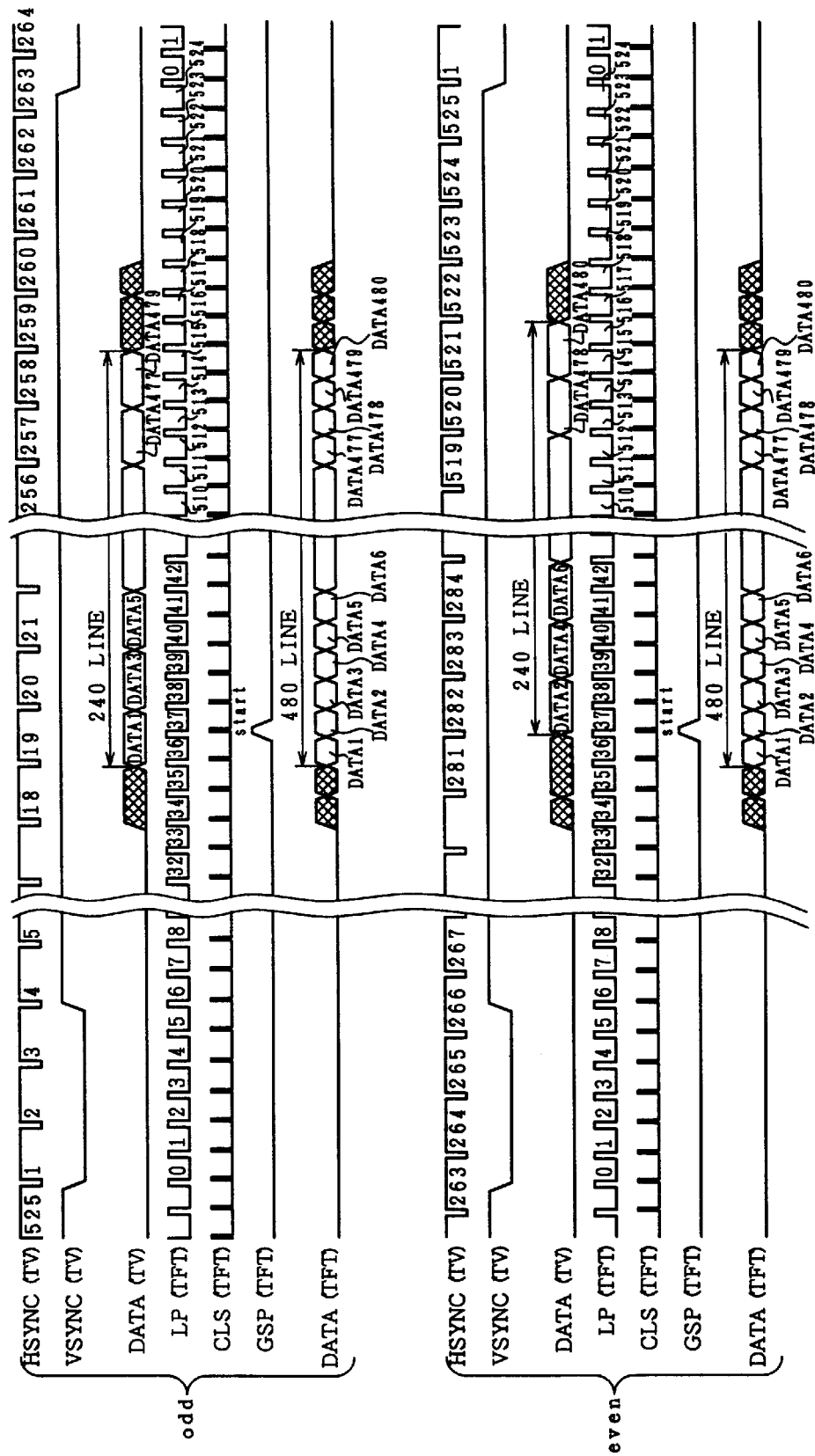
FIG. 15 is a waveform diagram that explains the scanning operation in the vertical direction of the display control circuit shown in FIG. 13.

FIG. 15 is a waveform diagram for explaining the scanning operation in the vertical direction of the display control circuit 51. Although this arrangement is the same as those shown in FIG. 4 and FIG. 9 in that RGB data on line number 1 (indicated by DATA1 and DATA2 in the Figure) is outputted from pulse number 19 and pulse number 282 of the horizontal synchronous signal HSYNC, it differs from them in that both the latch pulse LP and the re-writing pulse CLS are outputted twice within one period of the horizontal synchronous signal HSYNC. Moreover, to the television receiver 23, RGB data (DATA1, DATA3, ..., DATA479) on the odd-numbered line is outputted at the time of the odd field and RGB data (DATA2, DATA4, ..., DATA480) on the even-numbered line is outputted at the time of the even field, while to the liquid crystal display device 42, all the RGB data on 480 lines (DATA1, DATA2, DATA3, DATA4, ..., DATA479, DATA480) are outputted at any time of the odd field and even field, which makes this arrangement different from those shown in FIG. 4 and FIG. 9.

With respect to one pulse of the horizontal synchronous signal HSYNC, two pulses of the latch pulse LP are outputted to the driver circuit (not shown) of the liquid crystal display 42 and two pulses of the re-writing pulse CLS are also outputted to the display element; thus, data corresponding to one line, latched by the driver circuit, is outputted to one line of the display element. In other words, the RGB data of DATA1, DATA2, . . . , DATA479, and DATA480 are displayed on both of the odd and even fields (see FIG. 15).

Moreover, this arrangement is the same as that shown in FIG. 4 in that the reading operation of RGB data is started from line number 19 in the odd field and from line number 282 in the even field of the horizontal synchronous signal HSYNC 4; however, in the odd field of the television receiver 23, RGB data on the odd lines (DATA1, DATA3, DATA479) are successively read out from the display memory 43, and in the even field thereof, RGB data on the even lines (DATA2, DATA4, . . . , DATA480) are read out.

Figure 16:
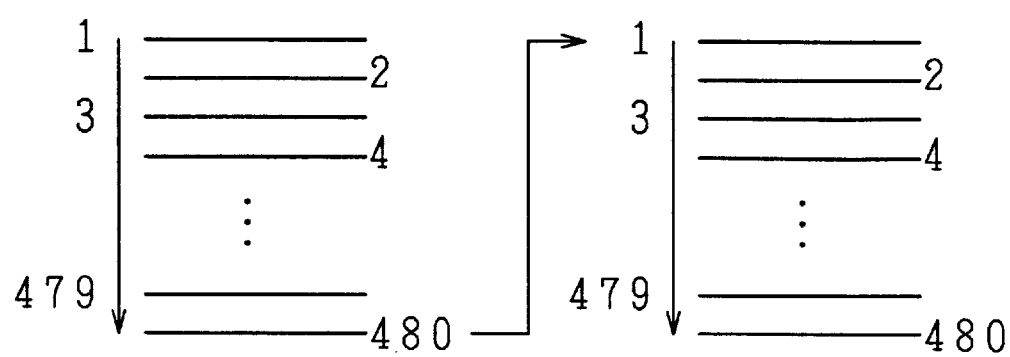
FIG. 16 is an explanatory drawing that shows an example of a television display that is made by the display control circuit of FIG. 13.

With this arrangement, the aforementioned image display by means of the interlace scanning system as shown in FIG. 5 is carried out on the television receiver 23, and image display by means of the non-interlace scanning system as shown in FIG. 16 is carried out on the liquid crystal display device 42 with a vertical resolution of 480 (DATA1, DATA2, . . . , DATA480).

FIG. 16 shows display lines in non-interlace scanning in the liquid crystal display 42. Here, while the odd field is displayed on the television receiver 23, all the data of 480 lines (DATA1, DATA2, . . . , DATA480) is displayed on the liquid crystal display 42, and while the even field is displayed on the television receiver 23, all the data is also displayed on the liquid crystal display 42 in the same manner as the odd field. Additionally, figures in FIG. 16 represent corresponding RGB data read out line by line.

With this arrangement, image displaying by means of the interlace scanning system is carried out on the television receiver 23 as illustrated in FIG. 5, and image displaying by means of the non-interlace scanning of 480 lines/scan, as shown in FIG. 16, which is equivalent to VGA full-spec, can be carried out on the liquid crystal display device 42. In this manner, appropriate image outputs are respectively carried out both on the liquid crystal display 42 and the television receiver 23 that have mutually different numbers of scanning lines.

Additionally, in the control-signal timing generation circuit 57, the operation of the control-signal timing generation is carried out in the same manner as the control-signal timing generation circuit 33 in the aforementioned first embodiment.

As described above, the display control circuit of the present invention, which is designed to carry out the same image display simultaneously on a non-interlace matrix display device that is installed in an electronic appliance and on an interlace television receiver that is externally provided, is characterized in that, when the number of scanning lines of the matrix display device is the same as or similar to the number of effective scanning lines of the television receiver, the matrix display device and the television receiver are appropriately controlled by individual control signals and RGB data is commonly outputted after a predetermined time period has elapsed from receipt of a vertical synchronous signal so that data of the center line of the RGB data is displayed in the vicinity of the center of the screen of the television receiver.

Therefore, the RGB data that is to be displayed on the television receiver is made the same as RGB data on the matrix display device, that is, the common video memory and reading circuit can be used; therefore, it is possible to reduce the number of terminals of the display control circuit and also to simplify the circuit construction, even when the digital encoder used for the television receiver is provided as a separated device.

Moreover, another display control circuit of the present invention, which is designed to carry out the same image display simultaneously on a non-interlace matrix display device that is installed in an electronic appliance and on an interlace television receiver that is externally provided, is characterized in that, when the number of scanning lines of the matrix display device is equal or similar to the twice the number of effective scanning lines of the television receiver, the writing pulse for writing the RGB data from the latch circuit of the matrix display device to the display element is doubled in its frequency by using individual control signals and RGB data is commonly outputted after a predetermined time period has elapsed from receipt of a vertical synchronous signal so that the RGB data corresponding to one line in the television receiver is doubled vertically so as to be displayed on two lines in the matrix display device.

Therefore, even if there is a difference of virtually double in the vertical resolution between the matrix display device and the television receiver, image displaying can be carried out simultaneously by using the common RGB data; thus, it becomes possible to reduce the number of terminals of the display control circuit and also to simplify the circuit construction, even when the digital encoder used for the television receiver is provided as a separated device.

Furthermore, still another display control circuit of the present invention, which is designed to carry out the same image display simultaneously on a non-interlace matrix display device that is installed in an electronic appliance and on an interlace television receiver that is externally provided, is characterized in that RGB data for use in the television receiver are subjected to time-division multiplex and commonly outputted to the matrix display device and the digital encoder, with the control signals, such as a clock signal and a synchronous signal, being outputted individually, so that the control signals allow the matrix display device and the digital encoder to properly acquire the RGB data that has been subjected to time-division multiplex.

Therefore, even if there is a difference in the vertical resolution between the matrix display device and the television receiver and even when the digital encoder used for the television receiver is provided as a separated device, the output terminal of the RGB signal can be commonly used, making it possible to reduce the number of terminals.

Moreover, in the case when the number of scanning lines of a non-interlace matrix display device installed in an electronic appliance is equal or similar to twice the number of effective scanning lines of an interlace television receiver that is externally provided, the display control circuit may be designed so that the output period of the RGB data is divided by three, and RGB data corresponding to one pixel to be sent to the digital encoder and RGB data corresponding to two pixels to be sent to the matrix display device are multiplied on each other, and outputted after a lapse of a predetermined period from the receipt of a vertical synchronous signal.

In this case, full-spec image displaying can be carried out on a matrix display device having the number of frames two times the 30 frames of a television receiver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display control circuit, which carries out the same image display simultaneously on a non-interlace matrix display device and on an interlace television receiver through a digital encoder, comprising:

common storage means for storing RGB data to produce identical displays on the matrix display device and the television receiver simultaneously; and single reading means for reading the RGB data from the storage means and for outputting respective first and second control signals related to the displays on the matrix display device and the digital encoder, wherein, when there is a specific relationship between the number of scanning lines of the matrix display and the number of effective scanning lines of the television receiver, the reading means outputs the same RGB data read from the storage means to the matrix display device and the digital encoder after a predetermined time period has elapsed from receipt of a vertical synchronous signal, and also outputs the first and second control signals individually.

2. The display control circuit as defined in claim 1, wherein the number of scanning lines of the matrix display device is the same as or similar to the number of effective scanning lines of the television receiver.

3. The display control circuit as defined in claim 1, further comprising a longitudinal doubling means for generating a writing signal having a frequency twice as many as a writing frequency, wherein the specific relationship is defined as a relationship in which the number of scanning lines of the matrix display device is equal or similar to twice the effective scanning lines of the television receiver, and the reading means writes the RGB data onto the matrix display device in accordance with the writing signal.

4. A display control circuit, which carries out the same image display simultaneously on a non-interlace matrix display device and on an interlace television receiver through a digital encoder, comprising:

common storage means for storing RGB data to produce identical displays on the matrix display device and the television receiver simultaneously; and first and second reading means for reading the RGB data from the storage means and for respectively outputting first and second control signals related to the displays on the matrix display device and the digital encoder; and switching means for making a switchover in a time-division manner as to whether the RGB data is read from the storage means by using the first reading means or using the second reading means, wherein the switching means outputs the RGB data that has been released from the storage means and subjected to a time-division multiplexing to the matrix display device and the digital encoder while the first and second reading means output the first and second control signals to the matrix display device and the digital encoder individually.

5. The display control circuit as defined in claim 4, wherein, when the number of scanning lines of the matrix display device is equal or similar to twice the number of effective scanning lines of the television receiver, the output period of the RGB data is divided by three, and RGB data corresponding to one pixel to be sent to the digital encoder and RGB data corresponding to two pixels to be sent to the matrix display device are subjected to multiplexing, and outputted after a lapse of a predetermined period from receipt of a vertical synchronous signal.

6. A display control circuit, which allows a non-interlace matrix display device to carry out image display by using RGB data, outputs the RGB data to a digital encoder so as to be subject to an analog conversion so that the same image display is simultaneously carried out on an interlace television receiver, and is installed in an electronic appliance as an integral part with the matrix display device, wherein, when the number of scanning lines of the installed matrix display device is the same as or similar to the number of effective scanning lines of the television receiver, the RGB data is commonly outputted to the matrix display device and the digital encoder after a predetermined time period has elapsed from receipt of a vertical synchronous signal, while control signals, such as a clock signal and a synchronous signal, are individually outputted.

7. A display control circuit, which allows a non-interlace matrix display device to carry out image display by using RGB data, outputs the RGB data to a digital encoder so as to be subject to an analog conversion so that the same image display is simultaneously carried out on an interlace television receiver, and is installed in an electronic appliance as an integral part with the matrix display device, wherein, when the number of scanning lines of the installed matrix display device is equal or similar to twice the effective scanning lines of the television receiver, the RGB data is commonly outputted to the matrix display device and the digital encoder after a predetermined time period has elapsed from receipt of a vertical synchronous signal, with a writing pulse for writing the RGB data from a latch circuit of the matrix display device to a display element being doubled in its frequency, while control signals, such as the writing signal, a clock signal and a synchronous signal, are outputted individually.

8. A display control circuit, which allows a non-interlace matrix display device to carry out image display by using RGB data, outputs the RGB data to a digital encoder so as to be subject to an analog conversion so that the same image display is simultaneously carried out on an interlace television receiver, and is installed in an electronic appliance as an integral part of the matrix display device, characterized in that RGB data for use in the matrix display device and RGB data for use in the television receiver are subjected to time-division multiplexing and commonly outputted to the matrix display device and the digital encoder, with the control signals, such as a clock signal and a synchronous signal, being outputted individually, so that the control signals allow the matrix display device and the digital encoder to selectively acquire the RGB data that has been subjected to time-division multiplexing.

9. This display control circuit as defined in claim 8, characterized in that, when the number of scanning lines of the matrix display device is equal or similar to twice the number of effective scanning lines of the television receiver, the output period of the RGB data is divided by three, and RGB data corresponding to one pixel to be sent to the digital encoder and RGB data corresponding to two pixels to be sent to the matrix display device are subjected to time-division multiplexing, and outputted after a lapse of a predetermined period from receipt of a vertical synchronous signal.

* * * * *